United States Patent
Okazaki et al.

(10) Patent No.: US 7,415,321 B2
(45) Date of Patent: Aug. 19, 2008

(54) ROBOT CONTROLLER

(75) Inventors: Yasunao Okazaki, Kusatsu (JP);
Kazuyuki Sakiyama, Shijonawate (JP);
Katsuhiko Asai, Nara (JP); Masaki Yamamoto, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 635 days.

(21) Appl. No.: 10/538,770

(22) PCT Filed: Dec. 11, 2003

(86) PCT No.: PCT/JP03/15834

§ 371 (c)(1),
(2), (4) Date: Jun. 10, 2005

(87) PCT Pub. No.: WO2004/052598

PCT Pub. Date: Jun. 24, 2004

(65) Prior Publication Data

US 2006/0184272 A1  Aug. 17, 2006

(30) Foreign Application Priority Data

Dec. 12, 2002   (JP)  ............................. 2002-360804

(51) Int. Cl.
*G06F 19/00* (2006.01)
(52) U.S. Cl. ...................... 700/245; 700/246; 700/251; 700/253; 700/260; 700/261; 318/568.1; 318/568.12; 318/568.16; 318/568.17; 318/568.2; 901/1; 901/9; 901/46
(58) Field of Classification Search .................. 700/245, 700/246, 251, 253, 260, 261; 318/568.1, 318/568.12, 568.16, 568.17, 568.2; 901/1, 901/9, 46

See application file for complete search history.

(56) References Cited

U.S. PATENT DOCUMENTS 3,851,769 A * 12/1974 Noguchi et al. .......... 414/744.3

(Continued)

FOREIGN PATENT DOCUMENTS

JP            3-222542         10/1991

(Continued)

OTHER PUBLICATIONS

Tan et al., Hybrid system design for singularityless task level robot controllers, 2000, IEEE, p. 3007-3012.*

(Continued)

*Primary Examiner*—Khoi H. Tran
*Assistant Examiner*—Marc McDieunel
(74) *Attorney, Agent, or Firm*—Wenderoth, Lind & Ponack, L.L.P.

(57) ABSTRACT

Realized is a robot controller capable of handling a large amount of data of images and so on necessary for advanced intelligence of control while securing a real-time performance with a simple structure. For this purpose, there are provided a motion control device for performing a calculation process for achieving motion control of an object to be controlled, a recognition and planning device for performing task and motion planning of the object to be controlled and recognition of outside world, an input/output interface for outputting a command to the object to be controlled and receiving as input, a state of the object to be controlled, and a route selecting device for controlling communications by switching connections among the motion control device the recognition and planning device, and the input/output interface. While controlling the communications by switching the connections among the motion control device, the recognition and planning device, and the input/output interface by the route selecting device, the motions of the robot of the object to be controlled are controlled on the basis of the results of the task and motion planning of the object to be controlled and the recognition of the outside world.

16 Claims, 13 Drawing Sheets

U.S. PATENT DOCUMENTS

| | | | | |
|---|---|---|---|---|
| 4,166,543 | A | * | 9/1979 | Dahlstrom .................. 700/251 |
| 4,791,588 | A | * | 12/1988 | Onda et al. ................. 700/260 |
| 5,621,672 | A | | 4/1997 | Kobayashi et al. |
| 5,956,465 | A | * | 9/1999 | Takagi et al. ................ 700/255 |
| 6,917,176 | B2 | * | 7/2005 | Schempf et al. ........ 318/568.11 |
| 7,053,579 | B2 | * | 5/2006 | Moridaira ............. 318/568.12 |

FOREIGN PATENT DOCUMENTS

| | | |
|---|---|---|
| JP | 5-503821 | 6/1993 |
| JP | 6-290060 | 10/1994 |
| JP | 6-334705 | 12/1994 |
| JP | 7-312614 | 11/1995 |
| JP | 9-36897 | 2/1997 |
| JP | 2001-334482 | 12/2001 |
| WO | 91/10960 | 7/1991 |

OTHER PUBLICATIONS

Gerke et al., Fuzzy collision avoidance for industrial robots, 1995, IEEE, p. 510-517.*

Akella et al., Discontinuous model-based adaptive control for robots executing free and constrained tasks, 1994, IEEE, p. 3000-3007.*

Hirana et al., Realization of skill controllers for manipulation of deformable objects based on hybrid automata, 2001, IEEE, p. 2674-2679.*

* cited by examiner

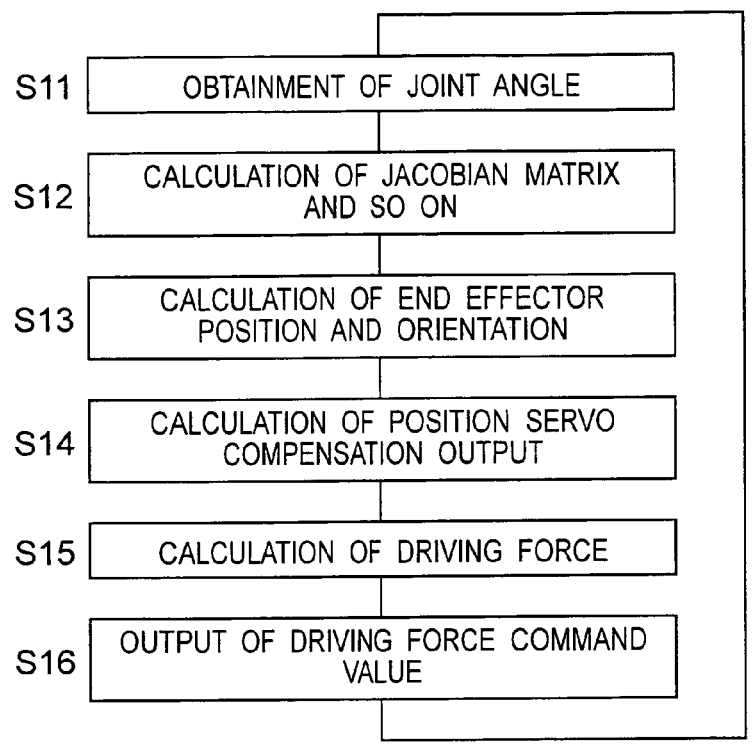
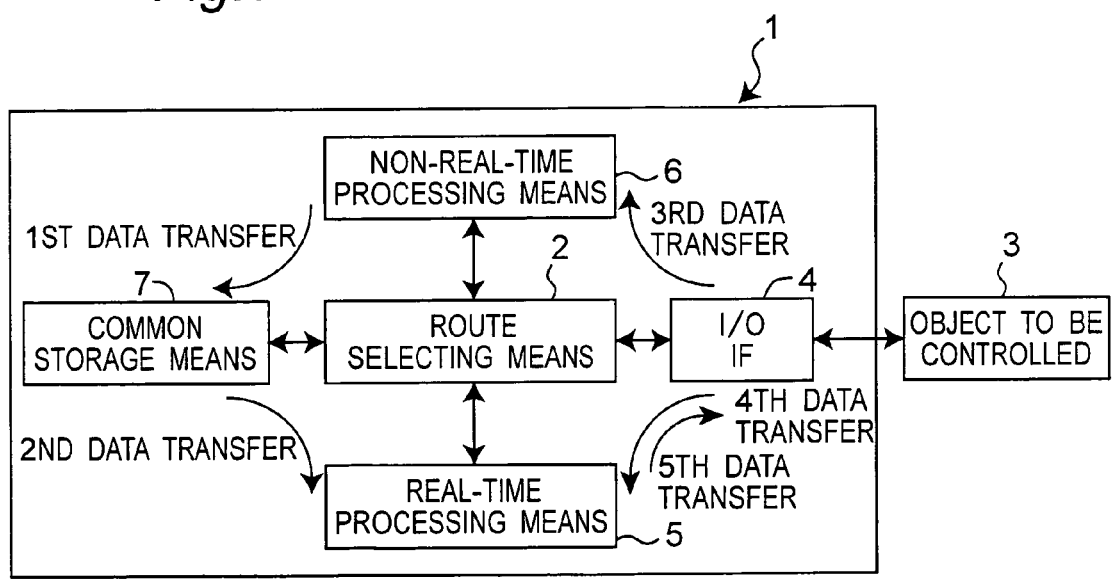

APPROACH MOTION

Fig. 16

| | TRANSFER ORIGINATOR | TRANSFER DESTINATION | DATA TYPE | PREFERENTIAL DATA | | |
|---|---|---|---|---|---|---|
| | | | | 1ST MODE | 2ND MODE | 3RD MODE |
| 1ST DATA TRANSFER | NON-REAL-TIME PROCESSING MEANS | COMMON STORAGE MEANS | DESIRED TRAJECTORY DATA | | | |
| 2ND DATA TRANSFER | COMMON STORAGE MEANS | REAL-TIME PROCESSING MEANS | DESIRED TRAJECTORY DATA | ○ | | |
| 3RD DATA TRANSFER | I/O IF | NON-REAL-TIME PROCESSING MEANS | IMAGE DATA | | ○ | |
| 4TH DATA TRANSFER | I/O IF | REAL-TIME PROCESSING MEANS | JOINT ANGLE DATA | ○ | | |
| 5TH DATA TRANSFER | REAL-TIME PROCESSING MEANS | I/O IF | DRIVING FORCE VALUE COMMAND DATA | ○ | | |

Fig.17

| | | TRANSFER ORIGINATOR | | | | |
|---|---|---|---|---|---|---|
| | | NON-REAL-TIME PROCESSING MEANS→COMMON STORAGE MEANS | COMMON STORAGE MEANS→REAL-TIME PROCESSING MEANS | I/O IF→NON-REAL-TIME PROCESSING MEANS | I/O IF→REAL-TIME PROCESSING MEANS | REAL-TIME PROCESSING MEANS→I/O IF |
| | TRANSFER DESTINATION | | | | | |
| | OCCUPATION RATIO (%) | 1ST DATA TRANSFER | 2ND DATA TRANSFER | 3RD DATA TRANSFER | 4TH DATA TRANSFER | 5TH DATA TRANSFER |
| TRANSFER PATH | NON-REAL-TIME PROCESSING MEANS→ROUTE SELECTING MEANS | A | | 100-A | | |
| | REAL-TIME PROCESSING MEANS→ROUTE SELECTING MEANS | | 100-B-C | | B | C |
| | I/O IF→ROUTE SELECTING MEANS | | | 100-D-E | D | E |
| | COMMON STORAGE MEANS→ROUTE SELECTING MEANS | F | G | | | |

ROBOT CONTROLLER

TECHNICAL FIELD

The present invention relates to a robot controller that has a decentralized hierarchical structure for a recognition and plan processing system for performing recognition, determination, task planning, motion planning, and so on and a motion control processing system for performing real-time control, for achieving an intelligent robot or the like. In this case, if a case of an assembling task is taken as an example, the task planning means a planning process at an abstract concept level as exemplified by a component assembling sequence or how to assemble components together. On the other hand, the motion planning means a planning process for desired trajectory generation for finger operation to achieve an actual assembling task and desired position generation for force control.

BACKGROUND ART

In order to achieve an intelligent robot that has advanced intellectual abilities, a recognition and plan processing system for performing intelligent processing of recognition of the outside world, task planning, motion planning, and so on is needed in addition to the motion control system for performing the motion control.

As a structure for providing a controller for such an intelligent robot, the structure shown in FIG. 10 can be considered. In FIG. 10, the controller is constructed so that an input/output interface 104 connected to an object 105 to be controlled, a motion control means 101 connected to the input/output interface 104, a shared memory 103 connected to the motion control means 101, and a recognition and planning means 102 connected to the shared memory 103 are arranged connected in series.

The motion control system, which performs the motion control of the robot, is required to have a real-time performance and therefore implemented by the motion control means 101 constructed of a processing system that directly executes a control program or a system that employs a real-time OS, using no operation system (OS).

On the other hand, the processing of the recognition, the task and motion planning, and so on do not need the real-time performance and is preferably constituted of a computer system of, for example, a personal computer or a work station equipped with a general-purpose multi-task OS in terms of the development environment of software, high-speed processing abilities, and so on. The recognition and planning means denoted by the reference numeral 102 is implemented by a processing system that operates parallel independently of the motion control means 101.

When such a parallel hierarchy structure of the motion control means 101 and the recognition and planning means 102 is adopted, an issue of timewise delivery timing occurs when, for example, a desired trajectory generated by the recognition and planning program of the recognition and planning means 102 is transferred to the motion control means 101.

With regard to this issue, in the controller shown in FIG. 10, the controller has a shared memory 103 and the recognition and planning means 102 writes the desired trajectory into the shared memory 103, and the motion control means 101 achieves timewise timing buffering by reading the desired trajectory from the shared memory 103 (refer to, for example, Japanese Unexamined Patent Publication No. H06-290060 A).

In the controller shown in FIG. 10, a common bus system is adopted in terms of extendibility as a method for connecting the motion control means 101, the recognition and planning means 102, and the shared memory 103.

However, the conventional structure causes an issue that a data transfer wait time is generated due to the conflict of the bus failing in securing the real-time performance if it is attempted to take in a plurality of images or high-definition images by a plurality of imaging devices and handle a large amount of data for the achievement of further advanced intelligence.

Providing a bus exclusive for image transfer or providing a bus exclusive for connections among the means to prevent the above issue causes the complication of the system like an increase in the number of bus wiring lines and so on, and this is also disadvantageous in terms of the extendibility of the system.

Accordingly, the object of the present invention is to solve the issues of the conventional structure and provide a robot controller capable of handling a large amount of data of images and so on necessary for advanced intelligence of control while securing a real-time performance with a simple structure.

DISCLOSURE OF INVENTION

In accomplishing the above objects, the present invention is constructed as follows.

According to a first aspect of the present invention, there is provided a robot controller comprising:

a motion control means for performing a calculation process for achieving motion control of an object to be controlled;

a recognition and planning means for performing task and motion planning of the object to be controlled and recognition of outside world;

an input/output interface for outputting a command to the object to be controlled and receiving as input, a state of the object to be controlled; and a route selecting means for controlling communications by switching connections among the motion control means, the recognition and planning means, and the input/output interface, wherein motions of a robot of the object to be controlled are controlled on a basis of results of the task and motion planning of the object to be controlled and the recognition of the outside world while controlling communications by switching the connections among the motion control means, the recognition and planning means, and the input/output interface by the route selecting means.

For example, as one concrete example of the first aspect, there is provided a robot controller that includes: a motion control means for performing a calculation process for achieving real-time control;

a recognition and planning means for performing a calculation process for achieving intelligence processing;

an input/output interface for outputting a command to the object to be controlled and inputting a state of the object to be controlled; and a route selecting means for controlling communications by switching connections among the motion control means, the recognition and planning means, and the input/output interface, wherein the motions of the robot that is the object to be controlled are controlled while controlling the communications by switching the connections among the motion control means, the recognition and planning means, and the input/output interface by the route selecting means.

According to the second aspect of the present invention, there is provided a robot controller comprising:

motion control means for performing a calculation process for achieving motion control of an object to be controlled;

recognition and planning means for performing task and motion planning of the object to be controlled and recognition of outside world;

an input/output interface for outputting a command to the object to be controlled and receiving as input, a state of the object to be controlled;

a first route selecting means connected to the recognition and planning means; and a second route selecting means connected to the motion control means, the first route selecting means, and the input/output interface, wherein motions of a robot of the object to be controlled is controlled on a basis of results of the task and motion planning of the object to be controlled and the recognition of the outside world while controlling communications by switching connections between the second route selecting means and the recognition and planning means by the first route selecting means and while controlling communications by switching connections between the recognition and planning means and the first route selecting means by the second route selecting means.

For example, as one concrete example of the second aspect, there is provided a robot controller that includes: a motion control means for performing a calculation process for achieving real-time control;

a recognition and planning means for performing a calculation process for achieving intelligence processing;

an input/output interface for outputting a command to the object to be controlled and inputting a state of the object to be controlled;

a first route selecting means connected to the recognition and planning means; and a second route selecting means connected to the motion control means, the first route selecting means, and the input/output interface, wherein motions of a robot that is the object to be controlled are controlled while controlling the communications by switching the connections between the second route selecting means and the recognition and planning means by the first route selecting means and switching the connections among the motion control means, the first route selecting means, and the input/output interface by the second route selecting means.

According to a third aspect of the present invention, there is provided the robot controller as defined in the first or second aspect, wherein the route selecting means has a function to control an order of priority of data transfer, and the route selecting means controls communications by switching the connections among the motion control means, the recognition and planning means, and the input/output interface on a basis of the order of priority of data transfer.

According to a fourth aspect of the present invention, there is provided the robot controller as defined in the third aspect, wherein the route selecting means controls the order of priority of data transfer according to a control situation of the object to be controlled, and the route selecting means controls communications by switching the connections among the motion control means, the recognition and planning means, and the input/output interface on a basis of the order of priority of data transfer according to the control situation of the object to be controlled.

According to a fifth aspect of the present invention, there is provided the robot controller as defined in the third aspect, wherein the route selecting means controls the order of priority of data transfer according to a priority order data embedded in transfer data.

According to a sixth aspect of the present invention, there is provided the robot controller as defined in the third aspect, wherein the route selecting means operates to temporarily stop transfer of non-preferential data when controlling the order of priority of data transfer.

According to a seventh aspect of the present invention, there is provided the robot controller as defined in the third aspect, wherein the route selecting means operates to thin out non-preferential data when controlling the order of priority of the data transfer.

According to an eighth aspect of the present invention, there is provided the robot controller as defined in the first or second aspect, wherein the route selecting means has a function to control an occupation ratio of a data transfer capacity, and the route selecting means controls communications by switching the connections among the motion control means, the recognition and planning means, and the input/output interface on a basis of the occupation ratio of the data transfer capacity.

According to a ninth aspect of the present invention, there is provided the robot controller as defined in the eighth aspect, wherein the route selecting means controls the occupation ratio of the data transfer capacity according to the control situation of the object to be controlled, and the route selecting means controls communications by switching the connections among the motion control means, the recognition and planning means, and the input/output interface on a basis of the occupation ratio of the data transfer capacity according to the control situation of the object to be controlled.

According to a 10th aspect of the present invention, there is provided the robot controller as defined in the eighth aspect, wherein the route selecting means controls the occupation ratio of the data transfer capacity on a basis of occupation ratio data embedded in transfer data.

According to an 11th aspect of the present invention, there is provided the robot controller as defined in the first or second aspect, wherein the route selecting means has a function to control a clock rate of data transfer, and the route selecting means controls communications by switching the connections among the motion control means, the recognition and planning means, and the input/output interface by changing the clock rate of the data transfer according to a control situation of the object to be controlled.

According to a 12th aspect of the present invention, there is provided the robot controller as defined in the fourth, ninth or 11th aspect, wherein the control situation of the object to be controlled is a control error.

According to a 13th aspect of the present invention, there is provided the robot controller as defined in the fourth, ninth or 11th aspect, wherein the control situation of the object to be controlled is a control desired position.

According to a 14th aspect of the present invention, there is provided the robot controller as defined in any one of the fourth through seventh aspects, wherein the route selecting means has an exclusive signal line for making notification of a data transfer request.

According to a 15th aspect of the present invention, there is provided the robot controller as defined in the first or second aspect, wherein the route selecting means has a storage means to provide time buffering between the motion control means and the recognition and planning means, and the route selecting means controls communications by switching the connections among the motion control means, the recognition and planning means, and the input/output interface.

According to a 16th aspect of the present invention, there is provided the robot controller as defined in the ninth aspect, wherein the route selecting means operates so as to put a non-preferential data aside and stored in the storage means when controlling an order of priority of data transfer.

BRIEF DESCRIPTION OF DRAWINGS

These and other aspects and features of the present invention will become clear from the following description taken in conjunction with the preferred embodiments thereof with reference to the accompanying drawings, in which:

FIG. 6 is a flow chart showing the algorithm of a control program to be executed by the motion control means of the robot controller of the first embodiment of the present invention;

FIG. 7 is an explanatory view of a transfer mode;

FIG. 16 is a view showing a table of relations among first through fifth data transfers, transfer destinations, data types, and preferential data; and FIG. 17 is a view showing a table for explaining a transfer control method in a route selecting means in an (1-A)-th embodiment.

BEST MODE FOR CARRYING OUT THE INVENTION

Figure 1:
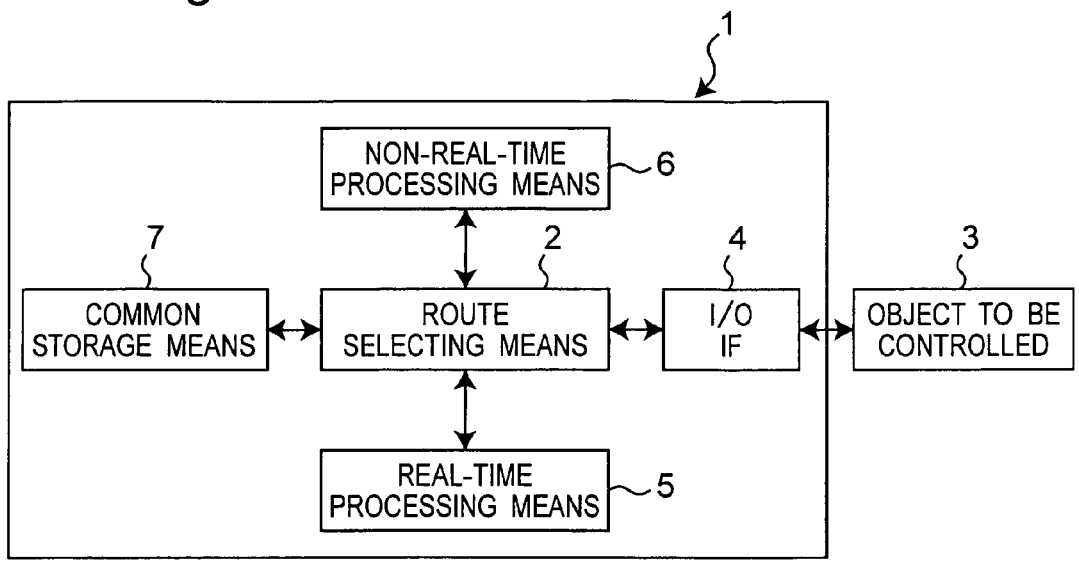
FIG. 1 is a block diagram showing the construction of a robot controller according to a first embodiment of the present invention.

Before the description of the present invention proceeds, it is to be noted that like parts are designated by like reference numerals throughout the accompanying drawings.

Various embodiments of the present invention will be described in detail below with reference to the drawings.

First Embodiment

FIG. 1 is a view showing the construction of a robot controller 1 of the first embodiment of the present invention. In FIG. 1, the reference numeral 2 denotes a route selecting means for changing the route of digital signals in the robot controller 1. The route selecting means 2 is connected to: an input/output interface 4 connected to an object 3 to be controlled of the robot controller 1 of the present embodiment to output a command to the object 3 to be controlled and input the state of the object 3 to be controlled; a motion control means 5 for performing calculation processes of the real-time calculation and so on for controlling motions of the object 3 to be controlled (a real-time processing means 5 for real-time calculation for controlling the object 3 to be controlled, as one concrete example); a recognition and planning means 6 for performing task and motion planning of the object 3 to be controlled and recognition of the outside world (a non-real-time processing means 6 for performing task and motion planning of the object 3 to be controlled and recognition of the outside world, as one concrete example); and a common storage means 7, and operates to control communications by switching connections among the motion control means 5, the recognition and planning means 6, and the input/output interface 4. As described above, the robot controller 1 controls the motions of the robot of the object 3 to be controlled on the basis of the results of the task and motion planning of the object 3 to be controlled and the recognition of the outside world while controlling the communications by switching the connections among the motion control means 5, the recognition and planning means 6, and the input/output interface 4 by the route selecting means 2. The connections among the means and so on are constituted of serial transmission paths for exchanging communications by serial digital data, and two-way communications by packet communications can be achieved.

The motion control means 5 can be made to function as the real-time processing means 5 when the calculation process for performing the motion control of the object 3 to be controlled is processed in real time, and to properly function simply as the motion control means 5 when the calculation process for performing the motion control of the object 3 to be controlled is processed without regard to its being real-time or non-real-time. Likewise, the recognition and planning means 6 can be made to function as the non-real-time processing means 6 when the task and motion planning and the recognition of the outside world of the object 3 to be controlled are processed in non-real time, and to properly function simply as the recognition and planning means 6 when the task and motion planning and the recognition of the outside world of the object 3 to be controlled are processed without regard to its being real-time or non-real-time. The motion control means 5 and the recognition and planning means 6 are described as the real-time processing means and the non-real-time processing means 6, respectively, as a concrete example in the following embodiments. However, the motion control means 5 can be read simply as the motion control means 5 particularly when the motion control means 5 is not required to function as the real-time processing means 5, and the recognition and planning means 6 can be read simply as the recognition and planning means 6 when the recognition and planning means 6 is not required to function as the non-real-time processing means 6.

Figure 2:
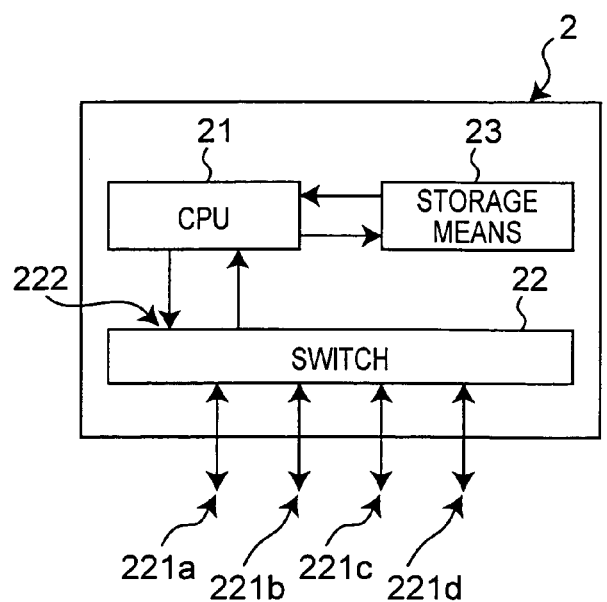
FIG. 2 is a block diagram showing the structure of a route selecting means of the robot controller of the first embodiment of the present invention.

In this case, the construction of the robot controller 1 of the first embodiment is described more in detail taking a case where a manipulator 48 of four degrees of freedom is controlled as a robot of one example of the object 3 to be controlled. FIG. 2 is a view showing the structure of the route selecting means 2, illustrating only the main functional blocks for the sake of easy understanding.

In FIG. 2, the reference numeral 21 denotes a one-chip type CPU integrated with an I/O controller and so on for controlling the function of the route selecting means 2 and the reference numeral 22 denotes a switch that is connected to the CPU 21 and switches the paths of the digital signals. The switch 22 has a plurality of external input/output ports 221a through 221d, which are connected to the input/output interface 4, the motion control means 5, the recognition and planning means 6, and the common storage means 7, respectively. The switch 22 further has an internal port 222 connected to the CPU 21, and the switching of the data transmission paths between each of the external input/output ports 221a through 221d and the internal port 222 is controlled by the CPU 21 via the internal port 222.

In FIG. 2, the reference numeral 23 denotes a storage means, which is connected to the CPU 21 and in which programs for operating the CPU 21 and data for switching the paths are stored.

Figure 3:
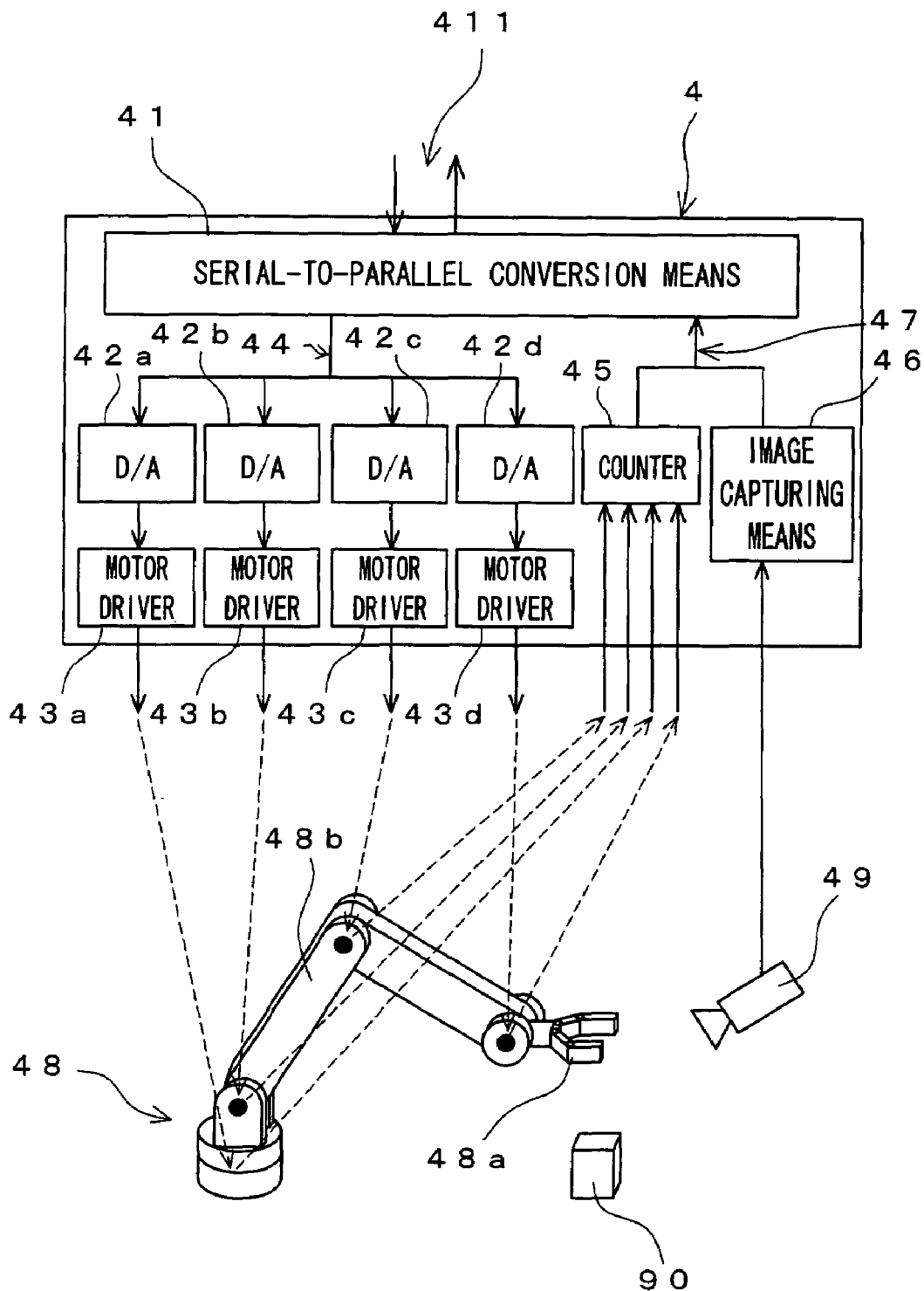
FIG. 3 is a view showing the structure of an input/output interface of the robot controller and a robot of the first embodiment of the present invention.

FIG. 3 is a view showing the structure of the input/output interface 4. In FIG. 3, the reference numeral 41 denotes a serial-to-parallel conversion means, and the serial-to-parallel conversion of the data that are inputted and outputted between an external input/output port 411 and an internal output port 44 and an internal input port 47 is performed by the serial-to-parallel conversion means 41. The external input/output port 411 is connected to the route selecting means 2 via a serial transmission path. Moreover, D/A converters 42a through 42d are connected to the internal output port 44 via a transmission line of a common parallel bus system, and the outputs of the D/A converters 42a through 42d are connected to motor drivers 43a through 43d. The motor drivers 43a through 43d are connected to motors (not shown) built in the respective joints of the manipulator 48 and independently drive the motors of the respective joints of the manipulator 48 according to the output signals from the D/A converters 42a through 42d. On the other hand, a counter 45 and an image capturing means 46 are connected parallel to the internal input port 47 via a transmission line of a common parallel bus system. Encoders (not shown) built in the joints of the manipulator 48 are connected to the counter 45, and the angles of the joints of the manipulator 48 rotated by the respective motors are detected by the encoders and inputted to the counter 45. An imaging device 49 is connected to the image capturing means 46, and the image of the object to be grasped by the manipulator 48 is image-picked up.

Figure 4:
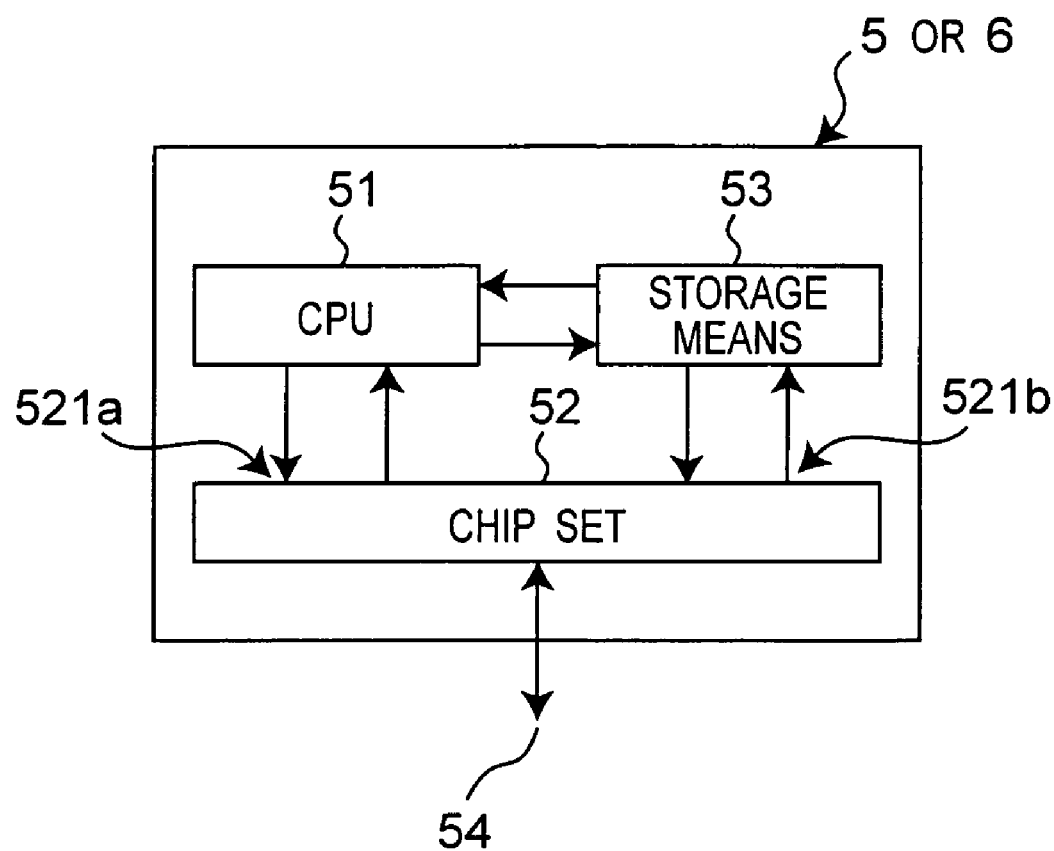
FIG. 4 is a block diagram showing the structure of the motion control means or the recognition and planning means of the robot controller of the first embodiment of the present invention.

FIG. 4 is a view showing the structure of the motion control means 5 or the recognition and planning means 6. In terms of hardware, the motion control means 5 and the recognition and planning means 6 are CPU boards of a general computer architecture of an identical construction, and only the main function blocks are shown in FIG. 4. In FIG. 4, the reference numeral 51 denotes a CPU for performing a calculation process for achieving control. The reference numeral 52 denotes a chip set in which an I/O controller, a memory controller, and so on are integrated, and which has a serial port 54 for inputting and outputting data to and from the outside. Moreover, the reference numeral 53 denotes a storage means for storing programs and data for performing the calculation process. The CPU 51 and the storage means 53 are independently connected to two internal ports 521a and 521b of the chip set 52.

In terms of software, the motion control means 5 is equipped with no OS (Operating System) and executes a process for control (e.g., real-time calculation for controlling the object 3 to be controlled) in a single-task manner. On the other hand, the recognition and planning means 6 is equipped with a multi-task OS stored in the storage means 53 and executes a process for task planning of the manipulator 48 and a process for motion planning and an image recognition process for image recognition in a time-sharing multi-task manner.

The motions of the robot controller 1 of the above construction are described with reference to the flow chart of FIG. 5 by taking a task as an example in which a rectangular parallelepiped object 90 (as one example of the object) placed in a certain region is grasped by an end effector 48a at the end of an arm 48b of the manipulator 48 by means of image recognition and the rectangular parallelepiped object 90 grasped by the end effector 48a is moved to a prescribed position.

Figure 5:
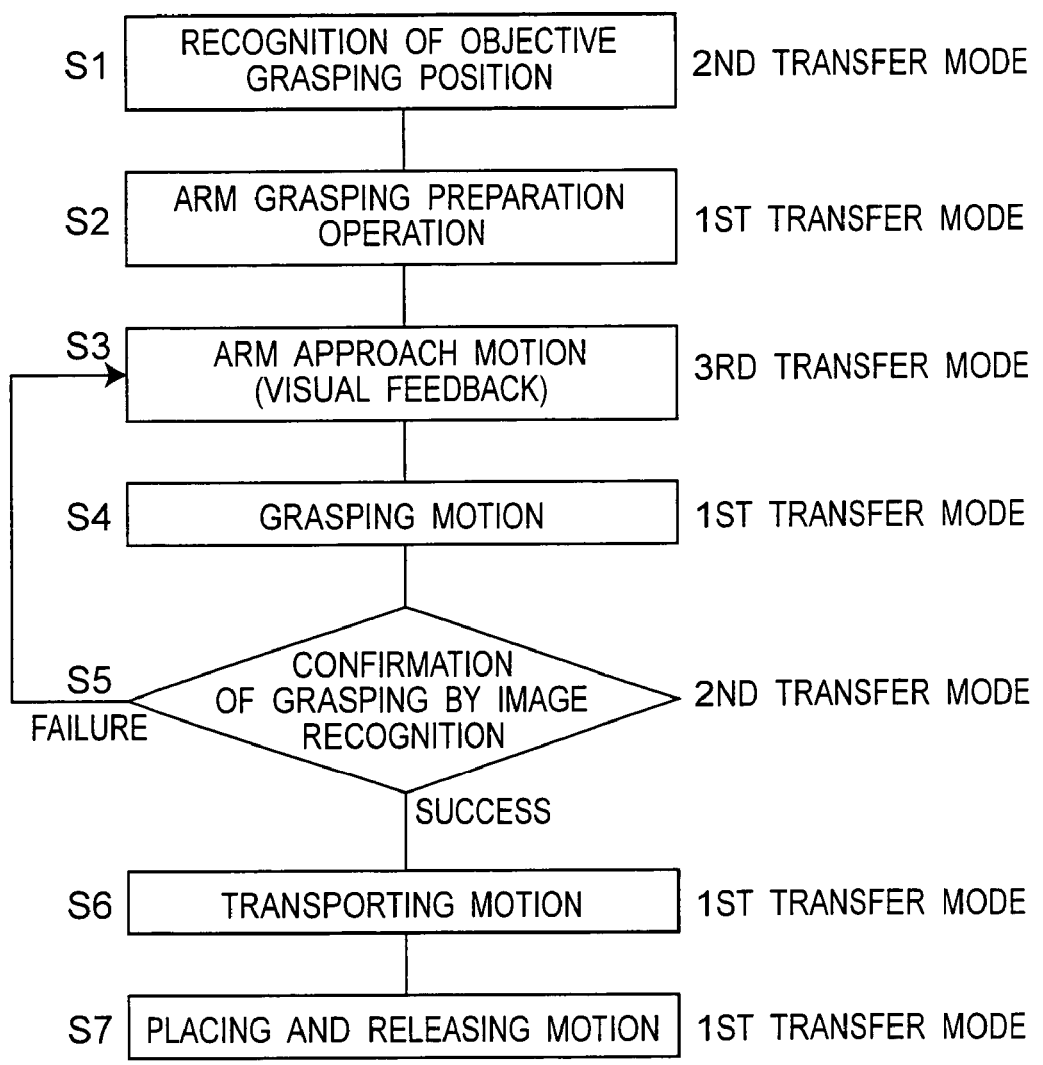
FIG. 5 is a flow chart concerning the task operation of the first embodiment of the present invention.

The operation steps shown in the flow chart of FIG. 5 have the execution sequence thereof planned and the progress thereof managed by the task planning process executed by the recognition and planning means 6.

First of all, a task planning process in step S1 calls the image recognition process. That is, the image recognition process executed by the recognition and planning means 6 recognizes the position, orientation, and size of the rectangular parallelepiped object 90 grasped by the manipulator 48 on the basis of the image captured by the imaging device 49 connected to the input/output interface 4 (step S1 in FIG. 5). The data of the recognition results are delivered to the task planning process as the position, orientation, and shape data of the absolute coordinate system of the rectangular parallelepiped object 90 viewed from the manipulator 48 by inter-process communications. The motion planning process to be generated by the recognition and planning means 6 generates a trajectory for moving the end effector 48a from its initial position to the rectangular parallelepiped object 90 and grasping the rectangular parallelepiped object 90 by the end effector 48a and a trajectory for transporting the grasped rectangular parallelepiped object 90 to a prescribed position by the end effector 48a by, for example, polynomial interpolation on the basis of the delivered position, orientation, and shape data. Target trajectory data generated by the recognition and planning means 6 are generated in the form of the position (end position (end effector position)) and orientation of the end effector 48a of the manipulator 48 at each time as well as the velocity and the angular velocity of the motion of the end effector 48a and transferred as serial data from the serial port 54 to the route selecting means 2.

The route selecting means 2 operates so as to store the desired trajectory data transferred from the recognition and planning means 6 into a prescribed position of the common storage means 7. Therefore, it is proper to consistently refer to the common storage means 7 with regard to the desired trajectory data that represents how the end effector 48a of the manipulator 48 should move.

In the motion control means 5, a control program for operating the end effector 48a of the manipulator 48 in conformity to the desired trajectory data is executed as follows (steps S2 through S7 in FIG. 5).

Figure 12A:
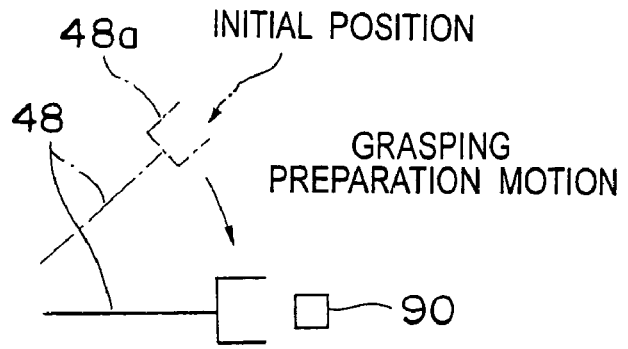
FIGS. 12A, 12B, and 12C are explanatory views for explaining a task operation of a manipulator in the first embodiment of the present invention.

That is, after the position, orientation, and size of the rectangular parallelepiped object 90 are recognized in step S1 of FIG. 5, a grasping preparation motion of the arm 48b by controlling the motion of the manipulator 48, which is the object 3 to be controlled, by the robot controller 1 on the basis of the desired trajectory data as shown also in FIG. 12A and moving the end effector 48a of the manipulator 48 to the neighborhood of the rectangular parallelepiped object 90 is performed in step S2 of FIG. 5. As one example, the end effector 48a of the manipulator 48 is pivoted to a position where the end effector 48a opposes to the rectangular parallelepiped object 90 around the basal end portion of the manipulator 48 in FIG. 12A.

Figure 12B:
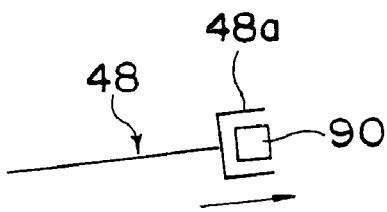

Next, the approach motion of the arm 48b by the image recognition is performed in step S3 of FIG. 5. This is, in concrete, visual feedback to detect the relative positional relation between the end effector 48a of the manipulator 48 and the rectangular parallelepiped object 90 through image recognition and move the end effector 48a to a position where the object 90 can be grasped by the end effector 48a while finely adjusting the position of the end effector 48a so that the end effector 48a and the rectangular parallelepiped object 90 are not brought in contact with each other as shown also in FIG. 12B.

Figure 12C:
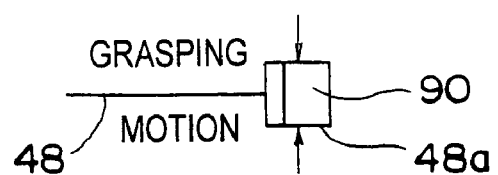

Next, in step S4 of FIG. 5, the motion of the manipulator 48 that is the object 3 to be controlled is controlled by the controller 1 on the basis of the desired trajectory data to perform a grasping motion to close the end effector 48a and thus grasp the rectangular parallelepiped object 90 as shown also in FIG. 12C.

Next, in step S5 of FIG. 5, the grasping by the image recognition on the basis of the image information that has been image-picked up by the imaging device 49 and captured by the image capturing means 46 is confirmed, i.e., it is determined whether or not the grasping motion of the rectangular parallelepiped object 90 by the end effector 48a has been successful. In concrete, the relative positional relation between the end effector 48a and the rectangular parallelepiped object 90 is detected by the image recognition, and the success or failure of the grasping motion is determined by the task planning process depending on whether the rectangular parallelepiped object 90 is located between the fingers of the end effector 48a. That is, it is determined that the grasping motion is successful when the rectangular parallelepiped object 90 is located between the fingers of the end effector 48a (see FIG. 12C) and the grasping motion is unsuccessful when the rectangular parallelepiped object 90 is not located between the fingers of the end effector 48a. When it is determined that the grasping motion is unsuccessful, the task planning process returns the operation step to step S3, and after the fine adjustment of the position of the end effector 48a is performed by the image recognition, the steps S4 and S5 are performed again. When it is determined that the grasping motion is successful, the program flow proceeds to step S6.

Next, in step S6 of FIG. 5, the motion of the manipulator 48, which is the object 3 to be controlled, is controlled by the controller 1 on the basis of the desired trajectory data, and the transporting motion of the rectangular parallelepiped object 90 grasped by the end effector 48a is performed.

Next, in step S7 of FIG. 5, the rectangular parallelepiped object 90 is transported to and placed in a prescribed position, and thereafter, the motion of the manipulator 48 is controlled by the robot controller 1 to spread the fingers of the end effector 48a that has grasped the rectangular parallelepiped object 90 and release the rectangular parallelepiped object 90 from the end effector 48a.

Next, the operation steps of the control program executed by the motion control means 5 are described with reference to FIG. 6.

In step S11 of FIG. 6, the motion control means 5 requests the route selecting means 2 to transfer the joint angle data of the manipulator 48. The route selecting means 2 requested to transfer the joint angle data requests the input/output interface 4 to transfer the joint angle data inputted to the counter 45. Encoder values of the joints of the manipulator 48 inputted to the counter 45 are sent back to the route selecting means 2 via the input/output interface 4, and the encoder values of the joints are transferred as current joint angle data (joint variable vector $q=[\theta_1, \theta_2, \theta_3, \theta_4]^T$, provided that $\theta_i$ is the angle of the i-th joint) from the route selecting means 2 to the motion control means 5.

In step S12 of FIG. 6, Jacobian matrix $J_r$ and so on necessary for kinematic calculations of the manipulator 48 are calculated by the motion control means 5.

Next, in step S13 of FIG. 6, the current end position and orientation vector r of the end effector 48a of the manipulator 48 are calculated by the motion control means 5 by using the joint variable vector q of the transferred current joint angle data.

In step S14 of FIG. 6, a position servo compensation input value vector $u_p$ concerning the end position is calculated by the motion control means 5 by using the following equation (1).

$$u_p = J_r^{-1}\{K_p(r_d - r) + K_v(\dot{r}_d - \dot{r})\} \quad (1)$$

It is noted that $r_d$ is the desired position of the end position and orientation vector, and $K_p$ and $K_v$ are the feedback gain matrixes.

In advance, the desired position vector $r_d$ of the position servo compensation is calculated by the recognition and planning means 6, and the calculation result is stored in the common storage means 7. Therefore, a desired position vector $r_d$ of the stored position servo compensation is taken from the common memory means 7 into the motion control means 5 via the route selecting means 2.

In step S15 of FIG. 6, a driving force vector τ, which should be added to the manipulator 48 for the achievement of control, is calculated from the kinetic equation and the position servo compensation input value vector $u_p$ by the motion control means 5 by using the following equation (2).

$$\tau = K_T u_p \quad (2)$$

It is noted that $K_T$ is a torque coefficient matrix.

In step S16 of FIG. 6, the driving force value vector τ calculated by the motion control means 5 in step S15 is outputted as a driving force command value from the external input/output serial port 54 of the motion control means 5. The route selecting means 2, which has received the driving force command value, transfers the driving force command value to the input/output interface 4, and the driving force command value is inputted to the D/A converter 42 via the input/output interface 4. The driving force command value of the digital signal is converted into a voltage command value by the D/A converter 42 and outputted from the D/A converter 42 via the input/output interface 4. The motor drivers 43a through 43d, which have received the voltage command value from the input/output interface 4, generate driving forces at the joints and the end effector 48a of the manipulator 48.

In the motion control means 5, a software feedback control system is constituted by executing the above calculation process loop of steps S11 through S16 of FIG. 6, and the intake of the joint angle data and the output of the driving force command value are executed at prescribed time intervals of, for example, 1 msec, achieving the real-time control. The control operation of the manipulator 48 is executed on the basis of the driving force value that is thus obtained and outputted.

Since a case where the control consistently takes effect is supposed while the power of the robot is on, the processing is in an endless loop. Therefore, it is also possible to achieve stationariness if a constant value is continuously given as a desired position.

In the above control operation, as shown in FIGS. 16 and 7, executed are:

(1) transfer of desired trajectory data from the recognition and planning means 6 to the common storage means 7 by the route selecting means 2 (first data transfer);

(2) transfer of desired trajectory data from the common memory means 7 to the motion control means 5 (second data transfer);

(3) transfer of image data from the input/output interface 4 to the recognition and planning means 6 (third data transfer);

(4) transfer of joint angle data from the input/output interface 4 to the motion control means 5 (fourth data transfer); and (5) transfer of driving force value command data from the motion control means 5 to the input/output interface 4 (fifth data transfer).

Since the motion control means 5 and the recognition and planning means 6 are operating independently parallel, these transfer requests possibly cause timewise concurrence, or a disadvantageous case of overlapping. In particular, the image data has a large capacity, and the probability of the occurrence of overlapping is increased when the image data is transferred, and transfer wait frequently occurs.

As a countermeasure against the concurrence of the transfer requests from the motion control means 5 and the recognition and planning means 6, the route selecting means 2 performs control based on the order of priority of data transfer as described above. That is, the route selecting means 2 can set a plurality of data transfer modes, and the priority pattern of the data transfer is varied in each transfer mode. As one example of the priority pattern of the data transfer, a total of three modes of a first transfer mode, a second transfer mode, and a third transfer mode are set as follows according to the control state of the object to be controlled.

In the first transfer mode, the route selecting means 2 operates to give priority to the transfer request from the motion control means 5. An exclusive signal line for notification of the data transfer request is provided between the route selecting means 2 and the motion control means 5, and the route selecting means 2 can detect the data transfer request of the motion control means 5. In the case of the fourth data transfer and fifth data transfer, the route selecting means 2 operates so that the transmission path between the route selecting means 2 and the input/output interface 4 is preferentially used for the transfer of the joint angle data or the driving value command data, while the transfer of image data (third data transfer) is performed by thinning out the data or the transfer of the image data is temporarily stopped when there is no margin in the capacity of the transmission path. The route selecting means 2 operates so that the image data is transferred after the transfer of the joint angle data or the driving value command data ends. Moreover, in the case of the second data transfer, the route selecting means 2 operates so that the transmission path between the route selecting means 2 and the common storage means 7 is preferentially used. Therefore, the transfer of the desired trajectory data (first data transfer) from the recognition and planning means 6 to the common storage means 7 is temporarily stopped, and the data that should be transferred is put aside stored in the storage means 23 of the route selecting means 2. The route selecting means 2 operates so that the desired trajectory data is transferred after the data transfer through the transmission path between the route selecting means 2 and the common storage means 7 ends. On the other hand, the second, fourth, and fifth data transfers, to which priority should be given, do not cause timewise overlap since the fourth data transfer, the second data transfer, and the fifth data transfer are executed in step S1, step S4, and step S6, respectively, as shown in FIG. 6.

Figure 11:
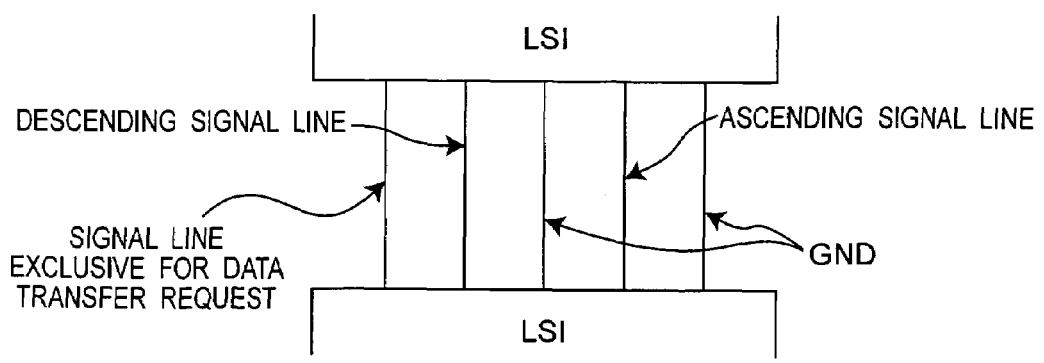
FIG. 11 is an explanatory view showing wiring lines between LSI's of the robot controller of the above embodiment of the present invention.

The exclusive signal line is as follows. That is, although the data transfer line is indicated by one arrow in FIG. 7, a plurality of lines actually exist as the wiring lines among the LSI's of the robot controller even in the case of serial transfer as in a case where signal lines, GND, and ascending and descending exclusive signal lines (i.e., ascending signal line and descending signal line) are provided. As shown in FIG. 11, the "exclusive signal line" means a data transfer request exclusive signal line exclusive for the data transfer request provided besides the signal lines, and the notification of the request is performed at high speed through the data transfer request exclusive signal line.

As described above, in the case of the first transfer mode, by controlling the data transfer by the route selecting means 2, the motion control means 5 is able to consistently obtain the joint angle data and output the driving force command value without wait. The real-time performance is secured even in a short sampling time, and stable control is achieved. Moreover, since the data transfer between the means is executed by serial communications using packets, multiplex communications utilizing intervals between packets is possible, and the transfer wait can further be reduced.

In the second transfer mode, the route selecting means 2 operates so that priority is given to the third data transfer (transfer of the image data) than to the fourth and fifth data transfers. By giving priority to the transfer of the image data, the image recognition of the recognition of the object to be grasped or the like can be performed at high speed. On the other hand, the motion control means 5 increases the sampling time in order to secure a real-time performance when operated as the real-time processing means, and the recognition and planning means 6 is made to function as the non-real-time processing means 6 so that the task planning process executed by the recognition and planning means 6 plans low-speed motion of the object 3 to be controlled or stops the motion, thereby preventing the motion of the object 3 to be controlled from being unstable.

In the third transfer mode, the route selecting means 2 operates so as to perform each data transfer evenly or at a prescribed ratio without giving priority to a specific data transfer. According to the third transfer mode, operation that needs compatibility between the transfer of image data like visual feedback for correcting the arm position while recognizing the object to be grasped by image recognition and the real-time transfer of the driving force command and the joint angle data is achieved.

In this case, in FIG. 16, the entry of the mark "o" means that priority is given to the data transfer with the mark "o" when the data with the mark "o" conflicts with the other data transfers. Therefore, in the case of the third transfer mode, there is no entry of the mark "o" because there is no data to which priority is given even if the conflict occurs.

For the transfer mode setting, the order of priority of the data transfer is predetermined by being planned in the task planning process according to, for example, the control situation of the object to be controlled and transferred as mode setting data and set in the route selecting means 2. When the rectangular parallelepiped object 90 placed in a certain region is grasped by the end effector 48a of the manipulator 48 by means of image recognition and moved to a prescribed position, the transfer mode is switched by the route selecting means 2 as shown on the right-hand side of FIG. 5, and rapid and stable task is achieved. That is, the route selecting means 2 switches the transfer mode so that the second transfer mode is used when the position, orientation, and size of the rectangular parallelepiped object 90 are recognized in step S1 of FIG. 5, the first transfer mode is used when the grasping preparation motion of the arm 48b is performed in step S2 of FIG. 5, the third transfer mode is used when the approach motion of the arm by the image recognition is performed in step S3 of FIG. 5, the first transfer mode is used when the grasping motion of the rectangular parallelepiped object 90 by the end effector 48a is performed in step S4 of FIG. 5, the second transfer mode is used when the grasping confirmation by the image recognition is performed in step S5 of FIG. 5, the first transfer mode is used when the transporting motion of the rectangular parallelepiped object 90 is performed in step S6 of FIG. 5, and the first transfer mode is used when the rectangular parallelepiped object 90 is transported, placed, and released in step S7 of FIG. 5.

Moreover, the route selecting means can also operate so as to thin out the non-preferential data instead of stopping the transfer of the non-preferential data when controlling the order of priority of the data transfer. That is, when the non-preferential data is image data, thinning-out of the data causes the quality of the image to be lowered although the volume of the data can be reduced, and thus, the clearness is reduced. That is, the accuracy of the image recognition is reduced when the clearness is reduced. When the transmission of the non-preferential data of the image data is temporarily stopped, the transmission of the image is completely stopped and no image can be obtained. However, when the transmission of the non-preferential data of the image data is "thinned out", the processing can be continued since an image can be obtained yet coarsely.

Although the route selecting means 2 of the present embodiment has been exemplified as a CPU board with individual LSI components of CPU and so on, a construction of a single-chip LSI in which all the functions are incorporated is also possible.

Moreover, although the route selecting means 2 has detected the transfer request by the signal line that gives notification of the data transfer request in the present embodiment, it is also possible to detect the transfer request by embedding the ID data of the originator of the transfer request in the transfer data.

Moreover, although the present embodiment has had three transfer modes, the present invention is not limited to this. It is possible to vary the type and the number of modes according to the structure of the object 3 to be controlled and the task contents.

According to the robot controller 1 of the first embodiment, there are provided the motion control means 5 for performing the calculation process for achieving the real-time control to function as the real-time processing means 5, the recognition and planning means 6 for performing the calculation process for achieving the intelligence processing to function as the non-real-time processing means 6, the input/output interface 4 for outputting a command to the object 3 to be controlled and inputting the state of the object 3 to be controlled, and the route selecting means 2 for controlling communications by switching the connections among the motion control means 5, the recognition and planning means 6, and the input/output interface 4, and the motions of the robot that is the object 3 to be controlled are controlled on the basis of the results of processing in the motion control means 5. Therefore, it is possible to handle a large amount of data of images and so on necessary for the advanced intelligence of the control while securing the real-time performance with the simple structure provided with the route selecting means 2 for controlling communications by switching the connections between the means 4, 5, and 6. With this arrangement, the connections among the means 4, 5, and 6 are allowed to have simple structures such as mere connection of a new means to the route selecting means 2 when the system is extended while securing the extendibility of the system, and the communications among the means 4, 5, and 6 can be controlled so that the transfer wait occurs less.

Moreover, when the arithmetic processing ability of the CPU is high speed and no complicated control such as control of a robot arm of three or less degrees of freedom is needed, the motion control is possible even if the motion control means 5 is constructed of a non-real-time processing means. This case has the advantages that a CPU board equipped with a general-purpose multi-task OS or the like can be used as the motion control means 5, and the construction of the system and the formation of the control program are easily achieved.

Moreover, it is also possible to provide the recognition and planning means 6 by a real-time means, and in this case, a simple system of a small-scale CPU board equipped with no OS, a CPU board equipped with a small-scale real-time OS, or the like is acceptable. Moreover, particularly when the motion planning is achieved by a real-time processing means, it is possible to generate the desired trajectory in real time and stably perform the motion control.

Moreover, the route selecting means 2 can secure the real-time performance of the motion control means 5 by operating so as to give priority to the transfer request from the motion control means 5.

Moreover, by making the route selecting means 2 have the storage means 23, and the motion control means 5, the recognition and planning means 6, the input/output interface 4, and the route selecting means 2 are mutually connected via the serial transmission paths and by putting the data to standby out of the data to be transferred aside stored in the storage means 23 of the route selecting means 2, time buffering between the motion control means 5 and the recognition and planning means 6 can be achieved by the storage means 23 of the route selecting means 2.

(1-A)-th Embodiment

FIG. 17 is a view showing a table for explaining a transfer control method in the route selecting means in an (1-A)-th embodiment. The construction of the (1-A)-th embodiment is similar to that of the first embodiment, in which the control is performed by not the order of priority of transfer but the occupation ratio of data of transfer. For example, in a transmission path that connects the recognition and planning means with the route selecting means, control of the data transferred by the route selecting means is performed by determining an occupation ratio A (%) of the first data transfer. It is noted that $0 \leq A \leq 100$. Moreover, in the transfer path that connects the control IF (Interface) with the route selecting means, control of the data transferred by the route selecting means is performed by determining an occupation ratio D (%) of the fourth data transfer and an occupation ratio E (%)

of the fifth data transfer. It is noted that $0 \leq D \leq 100$, $0 \leq E \leq 100$, and $0 \leq D+E \leq 100$. The other occupation ratios B, C, F, and G are also similar.

The occupation ratio is determined in the motion control means and the recognition and planning means according to the control situation and transferred as packet data to the route selecting means. The route selecting means controls the ratio of data transfer on the basis of the transmitted occupation ratio.

As an index that determines the occupation ratio of data transfer, the desired position and the control error of position control are used. For example, in the transmission path that connects the recognition and planning means with the route selecting means, an occupation ratio A (%) is determined by:

$$A = k_{od} |dr_d/dt| \qquad (1\text{-}A\text{-}1)$$

That is, a value obtained by multiplying a time differential value of the desired position vector of the end position and orientation by the constant gain $k_{od}$ is assumed to be the occupation ratio A (%).

Equation (1-A-1) is calculated in the recognition and planning means, and the data of the occupation ratio A is transferred as packet data from the recognition and planning means to the route selecting means. The route selecting means controls the data transfer on the basis of the received occupation ratio so that the ratio of the data transfer of the connection between the recognition and planning means and the route selecting means becomes A % in the case of the first data transfer and 100−A % in the case of the third data transfer.

According to Equation (1-A-1), the occupation ratio A is increased when the rate of change of the desired position is large, i.e., when the desired velocity is great, and the desired position is securely transferred, allowing the control to be stabilized. For example, when the maximum value of the desired velocity of the end effector is 0.5 m/s, A=80% when the mobile velocity of the end effector is at a maximum assuming that $k_{ad}$=160 s/m. When the end effector moves at high speed, the first data transfer for transferring the desired trajectory data necessary for the motion control comes to have an occupation ratio higher than that of the third data transfer, and the control can be stabilized.

Moreover, in the transmission path that connects the control IF with the route selecting means, the occupation ratio D(%) and the occupation ratio E(%) are determined by:

$$D = E = k_{oe} |(r_d - r)| \qquad (1\text{-}A\text{-}2)$$

where $k_{oe}$ is a constant gain.

Equation (1-A-2) is calculated by the motion control means, and the data of the occupation ratios D and E are transferred as packet data from the motion control means to the route selecting means. The route selecting means controls the data transfer on the basis of the received occupation ratio so that the ratio of the data transfer of the connection between the control IF and the route selecting means becomes 100−D−E % in the case of the third data transfer, D % in the case of the fourth data transfer, and E % in the case of the fifth data transfer.

According to Equation (1-A-1), the occupation ratios D and E are increased (made not greater than 100) when the arm end position and orientation error rd-r is increased, the ratio of the transfer data of the fourth data transfer and the fifth data transfer concerning the real-time motion control of the arm is increased, the control is directed toward stabilization, and the control error is reduced.

The communications between the route switching means and other means include not only the data transfer but also other communications of the occupation ratio data and the address that indicates the transfer destination and so on. Therefore, the occupation ratio of 100% does not mean the total occupation of the communication band but means 100% of the band allocated to the data transfer.

Moreover, although the maximum value of the occupation ratio has been described as 100% in the present embodiment, more advanced control is possible by limiting the maximum value to a value of not higher than 100% according to the operation mode. For example, when operation similar to that of FIG. 5 is performed, only the motion control of the arm is performed in step S2 and the image recognition is not needed. Therefore, operation is possible even when the maximum occupation ratio of the first data transfer is set to 100%. However, step S3 is the visual feedback, and the motions can be performed more smoothly when the image recognition processing and the motion control are concurrently performed. Therefore, only the motion control is performed and the image recognition process does not disadvantageously stop if the maximum occupation ratio of the first data transfer is limited to, for example, 70%, allowing reliable motions to become possible.

Moreover, although the occupation ratio of the first data transfer is assumed to be A % and the occupation ratio of the first data transfer is considered as a reference in the present embodiment, the present invention is not limited to this. For more advanced control, a method for changing the reference according to the operation mode can be considered. For example, when operation similar to that of FIG. 5 is performed, more reliable motions of the robot become possible by setting the third data transfer for transferring the image data as the reference since image recognition is necessary in step S1 and step S3 and setting the first data transfer as the reference since motion control is necessary in step S2.

Second Embodiment

Figure 8A:
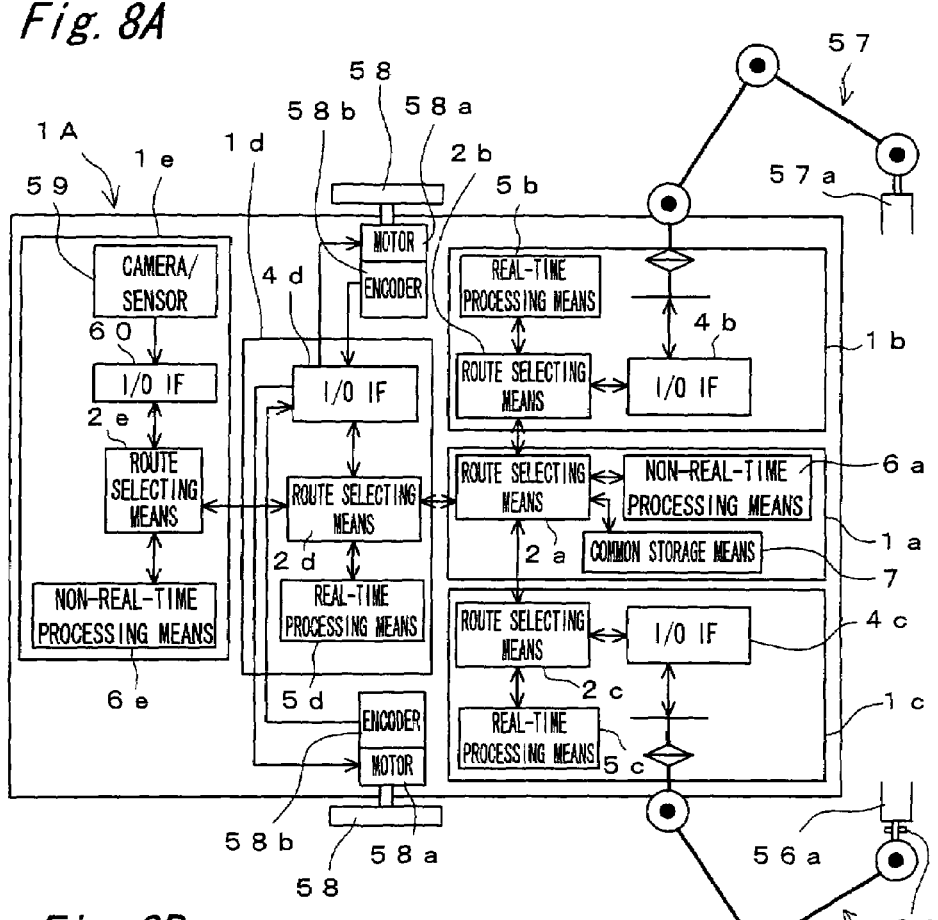
FIGS. 8A and 8B are a view showing the construction of a robot controller and a view of a robot, respectively, according to a second embodiment of the present invention.
Figure 8B:
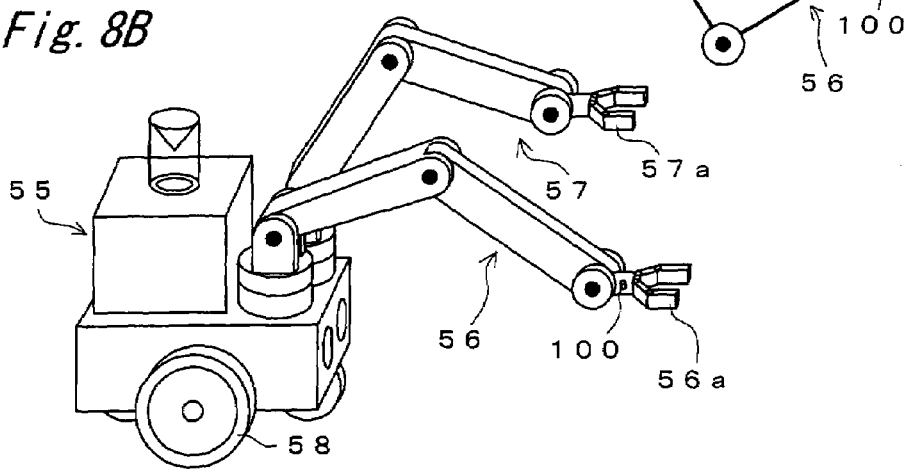

FIG. 8A is a view showing the construction of a robot controller 1A of the second embodiment of the present invention. As shown in FIG. 8A, the robot controller 1A of the second embodiment is constructed of first through fifth distributed control units 1a through 1e and constitutes function blocks by being arranged distributed in a body of an autonomous mobile robot 55 as a robot of one example of the object 3 to be controlled including left-hand and right-hand two arms 56 and 57 as shown in FIG. 8B. That is, the first distributed control unit 1a is an intelligence block that manages the planning and determination of motions, and the second and third distributed control units 1b and 1c are arm control blocks for controlling the motions of the two arms 56 and 57 that have end effectors 56a and 57a at the ends. The fourth distributed control unit 1d is a motion control block for managing the motions of the mobile robot 55 by driving left-hand and right-hand two wheels 58 and 58, and the fifth distributed control unit 1e is a recognition block that takes in information from a camera or sensor 59 and recognizes the state of the outside world.

In concrete, there is the following construction. It is noted that route selecting means 2a, 2b, 2c, 2d, and 2e have a construction similar to that of the route selecting means 2 of the foregoing embodiment and basically produce a similar function. Moreover, input/output interfaces 4b, 4c, and 4d have a construction similar to that of the input/output interface 4 of the foregoing embodiment and basically produce a similar function (i.e., function to independently drive the motors of the joints) as well as a function to independently drive the left-hand and right-hand wheels 58 and 58. Moreover, recognition and planning means 6*a* and 6*e* have a construction similar to that of the recognition and planning means 6 of the foregoing embodiment and basically produce a similar function. The recognition and planning means are equipped with a multi-task OS and execute a process for the planning and determination of the motions of the two arms 56 and 57 and the two wheels 58 and 58 and an image recognition process for image recognition in a time-sharing multitask manner. In this case, a functional difference between the recognition and planning means 6*a* and 6*e* resides in that the recognition and planning means 6*e* performs the image recognition process in contrast to the processing of the motions of the robot performed by the recognition and planning means 6*a*. For example, the processes for the planning and determination of the motions of the two arms 56 and 57 and the planning and determination of the motions of the two wheels 58 and 58 are performed by the recognition and planning means 6*a*, and the image recognition process for the image recognition is performed by the recognition and planning means 6*e*.

It is noted that a force sensor 100 for detecting the internal force exerted on one object when the object is grasped by the two arms is provided at the wrist of the arm 56. The force sensor 100 is properly provided for either the arm 56 or the arm 57.

Moreover, motion control means 5*b*, 5*c*, and 5*d* each have a construction similar to that of the motion control means 5 of the foregoing embodiment and basically produce a similar function. The means each are equipped with no OS (Operating System), and processes for the motion control of the left-hand and right-hand arms 57 and 56 (e.g., real-time calculation for the motion control of the left-hand and right-hand arms 57 and 56) are executed in a single-task manner.

First of all, the first distributed control unit 1*a* is constructed as the intelligence block constituted of: the recognition and planning means 6*a* for executing the process for the planning and determination of the motions of the two arms 56 and 57 and the process for the planning and determination of the motions of the two wheels 58 and 58 in a time-sharing multi-task manner; the route selecting means 2*a* connected to the recognition and planning means 6*a*; and the common storage means 7 that is connected to the route selecting means 2*a* and operates to store the desired trajectory data transferred from the recognition and planning means 6*a* by the route selection of the route selecting means 2*a* into a prescribed position and store each calculation result. The recognition and planning means 6*a* executes the process of the planning and determination of the motions of the two arms 56 and 57 and the process of the planning and determination of the motions of the two wheels 58 and 58 in the time-sharing multi-task manner.

The second distributed control unit 1*b* is constructed as the right-hand arm control block constituted of: the route selecting means 2*b* connected to the route selecting means 2*a* of the first distributed control unit 1*a*; the input/output interface 4*b* that is connected to the route selecting means 2*b* and a driving unit (e.g., a motor (not shown) that functions as a manipulator and that is built in each joint of the right-hand arm 57) of the right-hand arm 57; and the motion control means 5*b* that is connected to the route selecting means 2*b* and executes a process for motion control (e.g., real-time calculation for the motion control of the right-hand arm 57) in a single-task manner. The motion control means 5*b* executes the process for the motion control of the right-hand arm 57 in a single-task manner to control the motions of the right-hand arm 57.

The third distributed control unit 1*c* is constructed as the left-hand arm control block constituted of: the route selecting means 2*c* connected to the route selecting means 2*a* of the first distributed control unit 1*a*; the input/output interface 4*c* that is connected to the route selecting means 2*c* and a driving unit (e.g., a motor (not shown) that functions as a manipulator that is built in each joint of the left-hand arm 56) of the left-hand arm 56; and the motion control means 5*c* that is connected to the route selecting means 2*c* and executes a process for motion control (e.g., real-time calculation for the motion control of the left-hand arm 56) in a single-task manner. The motion control means 5*c* executes the process for the motion control of the left-hand arm 56 in a single-task manner to control the motions of the left-hand arm 56.

The fourth distributed control unit 1*d* is constructed as the motion control block constituted of: the route selecting means 2*d* connected to the route selecting means 2*a* of the first distributed control unit 1*a*; the input/output interface 4*d*, which is connected to the route selecting means 2*d* and independently outputs drive signals to motors 58*a* and 58*a* as one example of the driving units of the left-hand and right-hand wheels 58 and 58 and to which rotational angle detection signals from encoders 58*b* and 58*b* for detecting the rotational angles of the rotary shafts (or the axles of the wheels 58 and 58) of the motors 58*a* and 58*a* are inputted; and the motion control means 5*d* that is connected to the route selecting means 2*d* and executes a process for the motion control of the two wheels 58 and 58 (e.g., real-time calculation for the motion control of the two wheels 58 and 58) in a single-task manner. By driving the left-hand and right-hand two wheels 58 and 58, the mobile robot 55 is moved.

The fifth distributed control unit 1*e* is constructed as the recognition block constituted of: the route selecting means 2*e* connected to the route selecting means 2*d* of the fourth distributed control unit 1*d*; the input/output interface 60 connected to the route selecting means 2*e*; the camera or sensor 59 connected to the input/output interface 60; and the recognition and planning means 6*e* that is connected to the route selecting means 2*e* and executes an image recognition process for image recognition in a time-sharing multi-task manner. The recognition and planning means 6*e* executes the image recognition process for the image recognition for capturing information from the camera or sensor 59 and recognizing the state of the outside world in a time-sharing multi-task manner.

A task for grasping the rectangular parallelepiped object 90 (see FIG. 3) (one example of the object) placed in a certain region by means of the image recognition by the end effectors 56*a* and 57*a* at the ends of the two arms 56 and 57 and moving the rectangular parallelepiped object 90 grasped by the end effectors 56*a* and 57*a* into a prescribed position by the robot controller 1A of the above construction is described.

The image recognition process executed by the recognition and planning means 6*e* recognizes the position, orientation, and size of the rectangular parallelepiped object 90 grasped by the arms 56 and 57 on the basis of the image captured by the camera 59 connected to the input/output interface 60, and delivers the data of the recognition results as position, orientation, and shape data of the absolute coordinate system of the rectangular parallelepiped object 90 viewed from the arms 56 and 57 to the task planning process executed by the recognition and planning means 6*a*. The task planning process generated by the recognition and planning means 6*a* generates a trajectory for moving the end effectors 56*a* and 57*a* from the initial positions to the rectangular parallelepiped object 90 and grasping the rectangular parallelepiped object 90 by the end effectors 56*a* and 57*a* and a trajectory for transporting the grasped rectangular parallelepiped object 90 to a prescribed position by the end effectors 56a and 57a by using, for example, polynomial interpolation on the basis of the delivered position, orientation, and shape data. The desired trajectory data generated by the recognition and planning means 6a are generated in the form of the positions (end positions) and orientations of the end effectors 56a and 57a of the arms 56 and 57 and the velocities and angular velocities of the motions of the end effectors 56a and 57a at each time, and transferred as serial data from the input/output interface 60 to the route selecting means 2e.

The route selecting means 2e operates so as to store the desired trajectory data transferred from the recognition and planning means 6e into a prescribed position of the common storage means 7. Therefore, it is proper to consistently refer to the common storage means 7 for the desired trajectory data that indicates how the end effectors 56a and 57a of the arms 56 and 57 should move.

In the motion control means 5d connected to the route selecting means 2d directly connected to the route selecting means 2e and in the motion control means 5b and 5c connected to the route selecting means 2b and 2c indirectly connected to the route selecting means 2e via the route selecting means 2d and 2a, a control program for operating the end effectors 56a and 57a of the arms 56 and 57 strictly in conformity to the desired trajectory data is executed as follows.

Figure 13A:
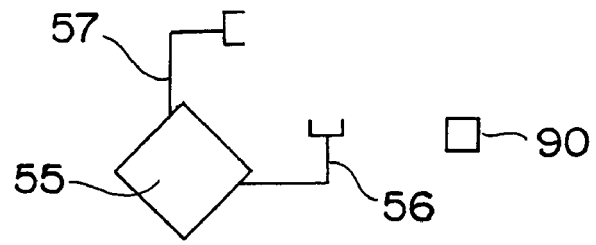
FIGS. 13A, 13B, 13C, and 13D are explanatory views for explaining a task operation of two arms in the second embodiment of the present invention.
Figure 13B:
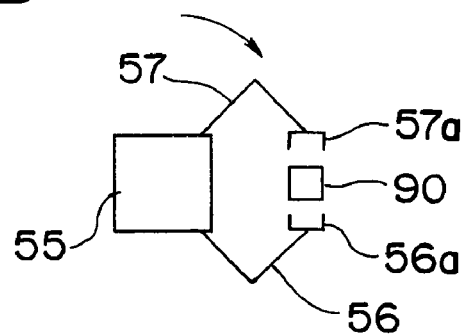

That is, after the position, orientation, and size of the rectangular parallelepiped object 90 are recognized, the grasping preparation motions of the arms 56 and 57 for controlling the motions of the arms 56 and 57 of the object 3 to be controlled by the control unit 1A on the basis of the desired trajectory data and moving the end effectors 56a and 57a of the arms 56 and 57 to the neighborhood of the rectangular parallelepiped object 90 are performed. As one example, as shown in FIGS. 13A and 13B, the autonomous mobile robot 55 moves to pivot to a position where the end effectors 56a and 57a of the arms 56 and 57 face the rectangular parallelepiped object 90.

Next, approach motions of the arms 56 and 57 by image recognition are performed. This is, in concrete, visual feedback to detect the relative positional relations between the end effectors 56a and 57a of the arms 56 and 57 and the rectangular parallelepiped object 90 by image recognition and move the end effectors 56a and 57a to positions where the object 90 can be grasped by the end effectors 56a and 57a as shown also in FIG. 13B while finely adjusting the positions of the end effectors 56a and 57a.

Figure 13C:
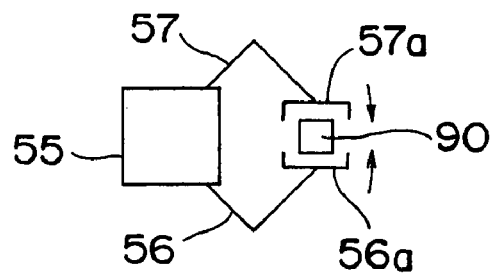
Figure 13D:
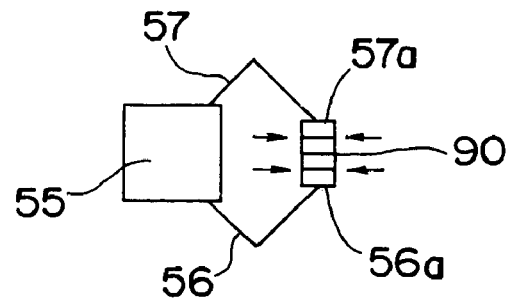

Next, the motions of the arms 56 and 57 of the object 3 to be controlled by the controller 1A are controlled on the basis of the desired trajectory data to perform a grasping motion for grasping the rectangular parallelepiped object 90 between the end effectors 56a and 57a by closing the fingers of the end effectors 56a and 57a concurrently with the grasping by confronting the end effectors 56a and 57a with each other as shown also in FIGS. 13C and 13D.

Next, the grasping by image recognition on the basis of the image information that has been imaged and captured by the camera 59 is confirmed, i.e., it is determined whether or not the grasping motion of the rectangular parallelepiped object 90 by the end effectors 56a and 57a has been successful. In concrete, the relative positional relations between the end effectors 56a and 57a and the rectangular parallelepiped object 90 are detected by the image recognition, and the success or failure of the grasping motion is determined depending on whether or not the rectangular parallelepiped object 90 is located between the end effectors 56a and 57a. That is, it is determined that the grasping motion is successful when the rectangular parallelepiped object 90 is located between the end effectors 56a and 57a (see FIG. 13D), and it is determined that the grasping motion is unsuccessful when the rectangular parallelepiped object 90 is not located between the end effectors 56a and 57a. When it is determined that the grasping motion is unsuccessful, the fine adjustment of the positions of the end effectors 56a and 57a by the image recognition is performed, and thereafter, the grasping motion and the grasping confirmation operation by image recognition are performed again.

When it is determined that the grasping motion is successful, the motions of the arms 56 and 57 of the object 3 to be controlled are controlled by the controller 1A on the basis of the desired trajectory data, and the transporting motion of the rectangular parallelepiped object 90 cooperatively grasped by the end effectors 56a and 57a is performed by cooperative control.

Next, the rectangular parallelepiped object 90 is transported and placed in a prescribed position, and thereafter, the motions of the arms 56 and 57 are controlled by the controller 1A to open the fingers of the end effectors 56a and 57a that have grasped the rectangular parallelepiped object 90, and an interval between the end effectors 56a and 57a is spread to release the rectangular parallelepiped object 90 from the end effectors 56a and 57a.

Next, operation steps of the control program executed by the motion control means 5b, 5c, and 5d are described.

First of all, the motion control means 5b and 5c request the route selecting means 2b and 2c to transfer the joint angle data of the arms 56 and 57. The route selecting means 2b and 2c that have received the request of the joint angle data requests the input/output interfaces 4b and 4c to transfer the joint angle data inputted to the respective counters 45. The encoder values of the joints of the arms 56 and 57, which have been inputted to the counters 45, are sent back to the route selecting means 2b and 2c via the input/output interfaces 4b and 4c, and the encoder values of the joints are transferred as the current joint angle data (joint variable vector $q_1$ (joint variable vector of the arm 56) and vector $q_2$ (joint variable vector of the arm 57)) from the route selecting means 2b and 2c to the motion control means 5b and 5c. It is noted that the output value of the force sensor 100 is also sent to the route selecting means 2c, 2a, 2b, and 2d via the input/output interface 4c during cooperative operation, and inputted from the route selecting means 2c, 2a, 2b, and 2d to the motion control means 5c, 5b, and 5d.

Next, calculations of Jacobian matrixes $J_{r1}$ and $J_{r2}$ and so on necessary for the kinematic calculations of the arms 56 and 57 are performed by the motion control means 5b and 5c.

Next, the current end position and orientation vectors $r_1$ and $r_2$ of the end effectors 56a and 57a of the arms 56 and 57 are calculated by the motion control means 5b and 5c by using the joint variable vector $q_1$ and the joint variable vector $q_2$ that are the transferred current joint angle data.

Next, position servo compensation input values $u_{p1}$ and $u_{p2}$ concerning the end positions are calculated by the motion control means 5b and 5c by using Equations (3a) and (3b) or Equations (4a) and (4b) stated hereinbelow.

In the case of independent operation (the case where the end effectors 56a and 57a are moved to the neighborhood of the rectangular parallelepiped object 90 and the case where the end effectors 56a and 57a are moved to the positions where the object 90 can be grasped by the end effectors 56a and 57a.):

$$u_{p1} = J_{r1}^{-1}\{K_{p1}(r_{1d} - r_1) + K_{v1}(\dot{r}_{1d} - \dot{r}_1)\} \qquad (3a)$$

$$u_{p2} = J_{r2}^{-1}\{K_{p2}(r_{2d} - r_2) + K_{v2}(\dot{r}_{2d} - \dot{r}_2)\} \qquad (3b)$$

In the case of cooperative operation (the case where the transporting motion of the rectangular parallelepiped object 90 cooperatively grasped by the end effectors 56a and 57a is performed by cooperative control.):

$$u_{p1} = J_{r1}^{-1}\{K_{pb}(r_{bd} - r_b) + K_{vb}(\dot{r}_{bd} - \dot{r}_b)\} - J_{r1}^T K_f \int_{t_0}^{t}(f_d - f)dt \quad (4a)$$

$$u_{p2} = J_{r2}^{-1}\{K_{pb}(r_{bd} - r_b) + K_{vb}(\dot{r}_{bd} - \dot{r}_b)\} - J_{r2}^T K_f \int_{t_0}^{t}(f_d - f)dt \quad (4b)$$

It is noted that $r_{1d}$ is the desired position of the end position and orientation vector of the arm 56, $r_{2d}$ is the desired position of the end position and orientation vector of the arm 57, $r_b = \{r_1 + r_2\}/2$, $r_{bd} = \{r_{1d} + r_{2d}\}/2$, f is the internal force vector exerted on the object to be grasped, and $f_d$ is the desired position of the internal force vector.

Since the desired position of the position servo compensation is preparatorily calculated by the recognition and planning means 6a and the calculation result is stored in the common storage means 7, the stored desired positions $r_{1d}$ and $r_{2d}$ of the end position and orientation vectors are taken in from the common storage means 7 to the motion control means 5b and 5c via the route selecting means 2b and 2c.

Next, the driving force vectors $\tau_1$ and $\tau_2$, which should be applied to the arms 56 and 57, are calculated from the kinetic equations and the position servo compensation input value vectors $u_{p1}$ and $u_{p2}$ by the motion control means 5b and 5c using Equation (5) stated below for the achievement of control, and the driving force values are obtained.

$$\tau_1 = K_T u_{p1}$$
$$\tau_2 = K_T u_{p2} \quad (5)$$

It is noted that $K_T$ is a torque coefficient matrix.

Next, the driving force value vectors $\tau_1$ and $\tau_2$ previously calculated by the motion control means 5b and 5c are outputted as driving force command values from the external input/output serial ports 54 of the motion control means 5b and 5c. The route selecting means 2b and 2c, which have received the driving force command values, transfer the driving force command values to the input/output interfaces 4b and 4c, and the driving force command values are inputted to the respective D/A converters 42 via the input/output interfaces 4b and 4c. The driving force command values of digital signals are converted into voltage command values by the respective D/A converters 42 and outputted from the respective D/A converters 42 via the respective input/output interfaces 4b and 4c. The motor drivers (see the motor drivers 43a through 43d of FIG. 3), which have received the voltage command values from the input/output interfaces 4b and 4c, generate driving forces in the joints and the end effectors 56a and 57a of the arms 56 and 57.

The motion control means 5b and 5c constitute a software feedback control system by executing the above calculation process loop, take in the joint angle data and output the driving force command values at determined time intervals of, for example, 1 msec, achieving real-time control.

On the basis of the driving force values that are thus obtained and outputted, the motions of the arms 56 and 57 and the wheels 58 are controlled.

In the distributed control system shown in FIG. 8A, the transfer operation of the route selecting means 2b, 2c, and 2d, which are connected to the plurality of blocks of the second through fourth distributed control units 1b, 1c, and 1d, becomes important unlike, for example, the route selecting means 2a, that is, without connected directly to the motion control means 5b, 5c, and 5d. For example, when one object is grasped cooperatively by the end effectors 56a and 57a of the two arms 56 and 57 as described above, a geometrical constrained relation occurs between the two arms 56 and 57, and therefore, it is necessary to perform the control taking the constrained relation into consideration. Moreover, since internal forces are generated in the grasped object 90 due to the mutual push and pull of the end effectors 56a and 57a of the two arms 56 and 57, it is necessary to perform control taking the internal forces into consideration. In order to achieve the cooperative control, the calculations of Equations (4a) and (4b) are necessary. Equations (3a) and (3b), which are mutually independent equations, have values common to those of the equations (4a) and (4b). Therefore, communications of the values are necessary between the motion control means 5b and 5c, and therefore, the cooperation between the second and third distributed control units 1b and 1c that control the arms 56 and 57 including the respective end effectors 56a and 57a must be performed in real time.

In order to achieve the real-time cooperation, in the second embodiment of the present invention, the motion control means 5b, 5c, and 5d output the data to be outputted from the motion control means 5b, 5c, and 5d with the priority order data embedded in the data. For example, in the case where connections among the motion control means 5b, 5c, and 5d and other means or the like are constituted of serial transmission lines, the priority order data can be embedded in a part of the block of the packet data. The route selecting means 2a, 2b, 2c, 2d, and 2e refer to the priority order data portion in the data transmitted from the motion control means 5b, 5c, and 5d and determine whether or not to preferentially transfer the data. In each of the route selecting means 2a, 2b, 2c, 2d, and 2e, the priority levels of the priority order data portions in the data are compared with each other. Priority is given to the data transfer of the higher order of priority, and the data transfer of the lower order of priority is temporarily stopped or put aside as in the first embodiment. When the data transfer of the higher order of priority ends, the transfer of the data of the lower order of priority is performed. As one example in which the priority order data is embedded in a part of the block of the packet data, it is possible to consider that a bit string constituting the packet has a construction in which a bit string representing a header, a bit string representing the transfer originator ID, a bit string representing the transfer destination ID, a bit string representing the priority order data, a bit string representing the data type, a bit string representing the transfer data, and a bit string representing the end of the packet are arranged in order from the head.

By performing the control based on the order of priority of the data transfer as described above, more advanced control, such as the cooperative operation of the two arms 56 and 57, the cooperative operation of the arms 56 and 57 with the wheels 58 and 58 when the autonomous mobile robot 55 grasps the rectangular parallelepiped object 90 by the arms 56 and 57 while moving and so on, can stably be performed.

Further, the robot controller 1A of the present invention, as shown in FIG. 8A, has a feature that blocks can be connected by using the route selecting means 2a, 2b, 2c, 2d, and 2e as nodes, allowing the distributed control system to be easily constructed. Moreover, if the communications between the blocks are performed by serial communications, the wiring inside the autonomous mobile robot 55 can be simplified. Moreover, if the connections are extended by using the route selecting means 2a, 2b, 2c, 2d, and 2e as nodes, the functions can be extended without modifying the structures of the individual motion control means 5b, 5c, and 5d, the recognition and planning means 6a and 6e, or the like. It becomes possible to easily advance the control by, for example, adding a speech recognition function to the image recognition.

Figure 14:
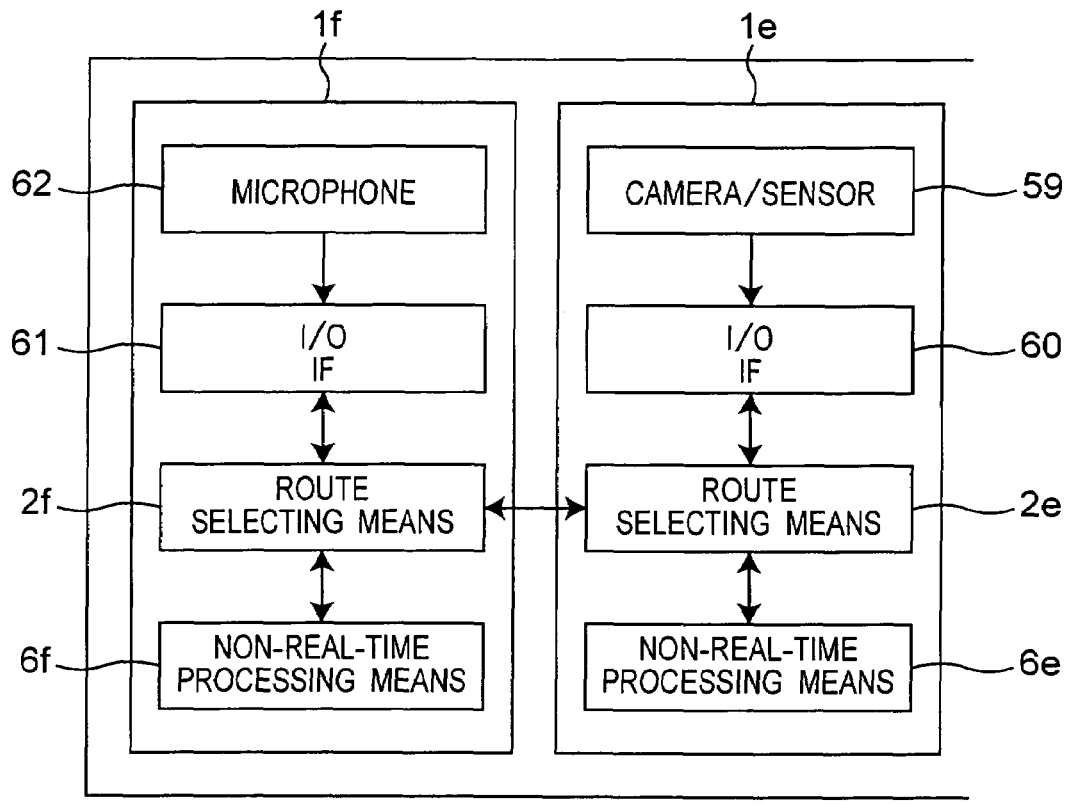
FIG. 14 is a view showing a part of the construction of the robot controller of the second embodiment of the present invention, to which a speech recognition function is added.

As one example, a concrete example in which the speech recognition function is added to the robot controller of FIG. 8A is described below. As shown in FIG. 14, a sound recognition function block 1f, which functions as a sixth distributed control unit, can be constructed of a microphone 62 as one example of the sound input unit, an input/output interface 61 connected to the microphone 62, a recognition and planning means 6f, and a route selecting means 2f that is connected to the recognition and planning means 6f and the input/output interface 61 and also connected to other route selecting means (e.g., 2e). Since the route selecting means 2a through 2e play the roles of the respective nodes, the route selecting means 2f of the speech recognition function block 1f may be connected to any one of other route selecting means without being limited to the route selecting means 2e. Moreover, instead of providing a block exclusive for the speech recognition like the speech recognition function block 1f, as shown in FIG. 14, it is also possible to provide a construction such that a speech recognition program is executed in a multi-task manner by the recognition and planning means 6e by using a microphone as one sensor of the cameras or sensors 59 of the fifth distributed control unit 1e.

(2-A)-th Embodiment

Operation when the route selecting means can control the clock rate of the data transfer path with a construction similar to that of the second embodiment shown in FIG. 8A of a (2-A)-th embodiment is described. The amount of data that the route selecting means 2a, 2b, and 2c should transfer is varied depending on when the arm 56 and the arm 57 independently operate as described in the second embodiment and when the arms cooperatively operate. In contrast to this, the (2-A)-th embodiment operate so as to increase the clock rate of the data transfer path by an integral multiple of, for example, double or triple when the arms are made to cooperatively operate in comparison with the case where the arms are made to independently operate. The control of the clock rate is achieved by the recognition and planning means that performs motion planning, and the clock rate is controlled by transferring a clock control command to the route selecting means when the cooperative operation is planned. By thus controlling the clock rate, low power consumption operation is performed with a low-speed clock when the arms independently operate necessitating not so fast data transfer speed, and the cooperation between the arms is secured with a high-speed clock when the arms cooperatively operates, achieving the cooperative operation.

Moreover, low power consumption operation is achieved by making the route selecting means 2e for transferring data from the camera or sensor 59 to the recognition and planning means 6e perform image recognition operate with a high-speed clock only when the image recognition is performed.

Third Embodiment

Figure 9A:
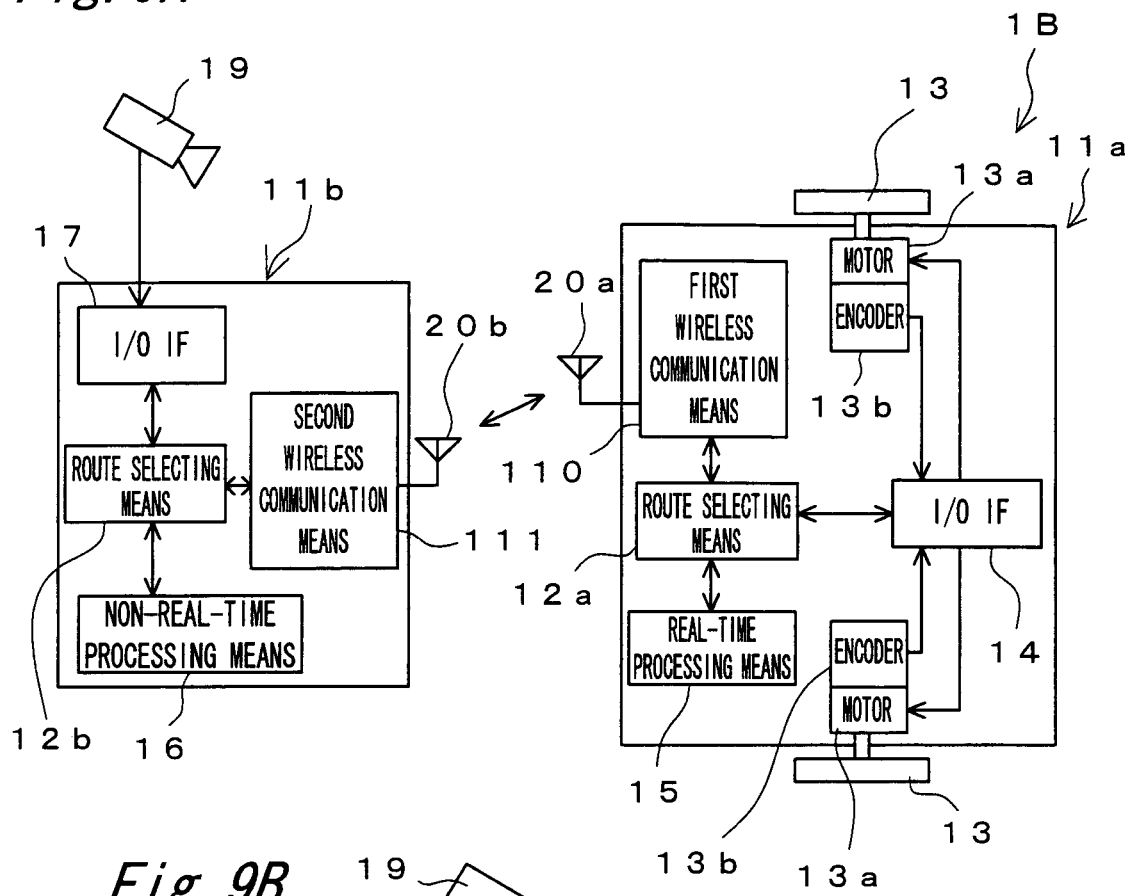
FIGS. 9A and 9B are views showing the construction of a robot controller and a view of a robot, respectively, according to a third embodiment of the present invention.
Figure 9B:
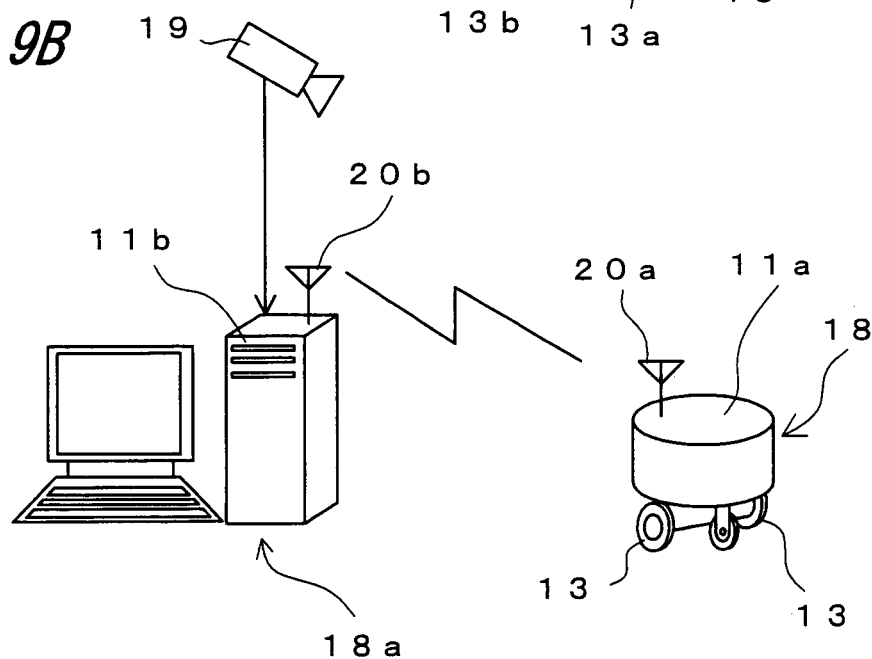
Figure 10:
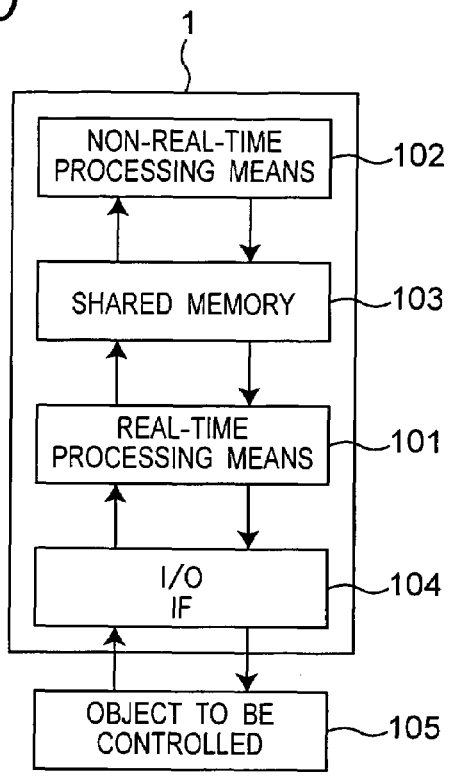
FIG. 10 is a block diagram showing the construction of a conventional controller.

FIG. 9A is a view showing the construction of a robot controller 1B of the third embodiment of the present invention. As shown in FIG. 9A, the robot controller 1B of the third embodiment has a structure separated into two sections of a movable-side control unit 11a provided for a mobile robot 18 as one example of the object 3 to be controlled and a fixed-side control unit 11b provided for a fixed member 18a. As shown in FIG. 9B, in the case of the application to the mobile robot 18, the sections that influence the real-time performance are integrated into the movable-side control unit 11a and mounted in the robot main body, and the other non-real-time sections are integrated into the fixed-side control unit 11b and fixedly placed in a fixed control unit 18a outside the robot main body of the mobile robot 18. By making wireless communications between the movable-side and fixed-side route selecting means 12a and 12b between antennas 20a and 20b, a mobile robot 18 that has high mobility and a high intelligence function can easily be constructed.

In concrete, the movable-side control unit 11a includes a first wireless communication means 110 to which the antenna 20a is connected, a movable-side route selecting means 12a connected to the first wireless communication means 110, an input/output interface 14 connected to the movable-side route selecting means 12a, and a motion control means 15 connected to the movable-side route selecting means 12a, constituting the sections that influence the real-time performance. The route selecting means 12a has a construction similar to that of the route selecting means 2 of the foregoing embodiment and basically produces a similar function. The input/output interface 14 has a construction similar to that of the input/output interface 4 of the foregoing embodiment and basically produces a similar function (i.e., function to independently drive the motors of the joints). The input/output interface 14 is connected to motors 13a and 13a as one example of the driving devices of the left-hand and right-hand wheels 13 and 13 and encoders 13b and 13b to independently output driving signals to the motors 13a and 13a and receives the inputs of rotational angle detection signals from the encoders 13b and 13b that detect the rotational angles of the rotary shafts of the motors 13a and 13a (or the axles of the wheels 13 and 13). The motion control means 15 has a construction similar to that of the motion control means 5 of the foregoing embodiment and basically produces a similar function. The motion control means 15 is equipped with no OS (Operating System) and executes a process for the motion control of the left-hand and right-hand wheels 13 and 13 (e.g., real-time calculations for the motion control of the left-hand and right-hand wheels 13 and 13) in a single-task manner.

The fixed-side control unit 11b includes a second wireless communication means 111 to which the antenna 20b is connected, a fixed-side route selecting means 12b connected to the second wireless communication means 111, an input/output interface 17 that is connected to the fixed-side route selecting means 12b and a camera 19, and a recognition and planning means 16 connected to the fixed-side route selecting means 12b, constituting the other non-real-time sections. The route selecting means 12b basically has a construction similar to that of the route selecting means 2 of the foregoing embodiment and produces a similar function. The recognition and planning means 16 basically has a construction similar to that of the recognition and planning means 6 of the foregoing embodiment and produces a similar function. The recognition and planning means 16 is equipped with a multi-task OS and executes a process for the planning and determination of the motions of the two wheels 13 and 13 of the mobile robot 18 and an image recognition process for image recognition in a time-sharing multi-task manner. As one example of the image recognition process, the position and the orientation of the mobile robot 18 are recognized on the basis of the image captured by the camera 19 connected to the input/output interface 17, and the data of the recognition results are delivered as position and orientation data of the absolute coordinate system of the mobile robot 18 to the task planning process by inter-process communications.

The first and second wireless communication means 110 and 111 are the means for modulating the digital data sent from the route selecting means 12b and 12a to thereby transmit the data as analog electromagnetic waves and receiving analog electromagnetic waves and demodulating the waves to obtain digital data, the means being constructed of a baseband circuit and an RF circuit, respectively. Moreover, a spread spectrum system or the like is appropriate for the wireless communication system.

The desired trajectory data planned in the task planning process is transferred to the second wireless communication means 111 by the route selecting means 12b and transmitted as electromagnetic waves after being modulated by the second wireless communication means 111. The electromagnetic waves received by the fixed-side control unit 11a are demodulated as desired trajectory data by the first wireless communication means 110. The demodulated desired trajectory data is temporarily stored in the storage means of the route selecting means 12a and transferred to the motion control means 15 after effecting time buffering.

The distributed control system shown in FIG. 9A must cope with the issue that transmission errors frequently occur during the wireless communications between the first and second wireless communication means 110 and 111 when the electromagnetic wave condition is bad, and re-transmission is repeated, causing transfer wait. In order to achieve stable real-time control even in the above situation, the route selecting means 12a gives priority to the data transfer between the motion control means 15 and the input/output interface 14. Moreover, when transmission errors frequently occur and the desired trajectory data cannot be obtained failing in effecting time buffering, the motion control means 15 slows down the sampling time and slows down the mobile robot or stop the mobile robot giving priority to the data transfer from the second wireless communication means 110, thereby preventing the operation from becoming unstable.

By performing the control of the data transfer based on the order of priority as described above, more advanced control can stably be performed.

Moreover, if the connections are extended using the route selecting means 12a and 12b as nodes, the extension of the function becomes possible without modifying the structures of the motion control means 15, the recognition and planning means 16, or the like, and it becomes possible to easily advance the control by, for example, adding a speech recognition function to the image recognition or adding a suction operation function when the mobile robot 18 is a cleaning robot.

The present invention is not limited to the above embodiments but allowed to be implemented in various other modes.

For example, although the image data has been transferred for the image recognition in the recognition and planning means in the examples of the first, second, and third embodiments, the present invention is not limited to them. Similar effects can be produced in the case of transfer of audio data for speech recognition or transfer of data (operation command data and inner force sense feedback data) for remote control via a communication network.

Moreover, although the arm type robot and the wheeled mobile robot have been the objects to be controlled in the first, second, and third embodiments, the present invention is not limited to them. It is a matter of course that similar effects can be produced in the cases of a device that has an actuator for performing prescribed operation of, for example, a human type biped robot or a quadruped robot other than the arm type robot and the wheeled mobile robot, an electronic component mounting apparatus, or an NC machining tool, or further in the field of mechanism control in transportation machines of automobiles (engine control, transmission control, ABS control, active suspension control, or the like) and so on.

Moreover, the route selecting means does not always give priority to the data transfer between the route selecting means and the motion control means but allowed to change the order of priority according to, for example, the level of the operation trouble, such as risk averting operation, of the robot. For example, it is acceptable to give priority to the data transfer for the risk averting operation than to all other data transfers and transfer the other data in the order of entry into the route selecting means with regard to the data transfer.

Moreover, it is acceptable to once set the information of the order of priority of data transfer in the route selecting means, thereafter enable input of altered information of the order of priority of data transfer and make the order of priority of data transfer changeable according to the control situations of changes in the use environment and changes in situation.

Figure 15:
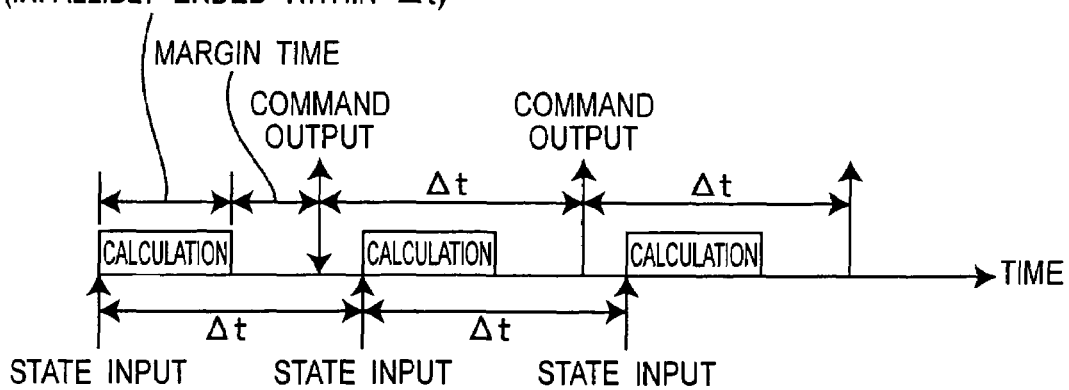
FIG. 15 is an explanatory view for explaining real-time processing.

The real-time processing in the motion control means is the processing for outputting commands for control at certain constant minute time intervals (e.g., 1 msec) $\Delta t$ (sampling time) and receiving as input, the state data (joint angle data etc.) of the object to be controlled and also the processing indispensable for the achievement of the motion control of mechanism by the feedback. Moreover, the task planning by the inoperative control means implies processing that does not perform time constrained like the certain constant minute time interval $\Delta t$. As one example, in FIG. 15, in a case where a prescribed calculation process is performed concurrently with a state input, and the calculation result is outputted as a command output, the command output, i.e., the calculation process for the motion control surely end within the time interval $\Delta t$, and the time to the command output becomes a margin time when the calculation process ends at an early stage within the time interval $\Delta t$. As described above, the real-time processing implies processing such that the inputting and outputting are surely executed every time interval $\Delta t$.

By properly combining arbitrary embodiments of the aforementioned various embodiments, the effects possessed by them can be produced.

According to the robot controller of the present invention, by providing the route selecting means for controlling communications by switching the connections among the means of, for example, the motion control means, the recognition and planning means, and the input/output interface, there can be provided a robot controller capable of allowing the connections among the means and so on to have simple constructions while securing the extendibility of the system, performing the switching control so that the transfer wait of the communications among the means and so on occurs less and handling a large amount of data of the image data and so on necessary for the advanced intelligence of control with a simple structure while securing the real-time performance.

Moreover, when the arithmetic processing ability of the CPU is high speed and no complicated control such as the control of the robot arm of three or less degrees of freedom is necessary, the motion control can be achieved even when the motion control means is constructed of a non-real-time processing means. This case has the advantages that a CPU board equipped with a general-purpose multi-task OS or the like can be used as the motion control means, and the construction of the system and the formation of the control program are easily achieved.

Moreover, it is also possible to provide the recognition and planning means by a real-time means, and this case accepts a simple system of a small-scale CPU board equipped with no OS, a CPU board equipped with a small-scale real-time OS or the like. Moreover, particularly when the motion planning is achieved by a real-time processing means, it becomes possible to generate the desired trajectory in real time and stably perform the motion control.

The provision of the plurality of route selecting means like the first route selecting means and the second route selecting means has the advantages that the construction, which has the plurality of distributed control units of 1a, 1b, 1c, 1d, and 1e as in the robot shown in FIG. 8A, or the construction, in which the control units are separated as in the robot shown in FIG. 9A, can easily be constructed.

Moreover, the robot controller of the present invention includes the motion control means for performing the calculation process for achieving the real-time control, the recognition and planning means for performing the calculation process for achieving the intelligence processing, the input/output interface for outputting a command to the object to be controlled and receiving as input, the state of the object to be controlled, and the route selecting means for controlling communications by switching the connections among the motion control means, the recognition and planning means, and the input/output interface.

With the above arrangement, the connections among the means and so on are allowed to have a simple structure such as mere connection of a new means to the route selecting means acceptable when the system is extended while securing the extendibility of the system, and the switching of communications among the means and so on can be controlled so that the transfer wait occurs less.

The route selecting means can secure the real-time performance of the motion control means by operating so as to give priority to the transfer request from the motion control means.

Moreover, the route selecting means has the storage means, and the motion control means, the recognition and planning means, the input/output interface, and the route selecting means are connected together via the serial transmission paths. With this arrangement, the data to stand-by out of the data that should be transferred are stored and put aside in the storage means of the route selecting means by the storage means of the route selecting means, time buffering can be provided between the motion control means and the recognition and planning means.

Moreover, the robot controller of the present invention includes the motion control means for performing the calculation process for achieving real-time control, the recognition and planning means for performing the calculation process for achieving intelligence processing, the common storage means for providing time buffering between the motion control means and the recognition and planning means, the input/output interface for outputting a command to the object to be controlled and receiving as input, the state of the object to be controlled, and the route selecting means for switching the connections among the motion control means, the recognition and planning means, the common storage means, and the input/output interface.

With the above arrangement, the intelligence processing can be executed parallel while executing the real-time control.

By properly combining the arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A robot controller comprising:
   a motion control means for performing a calculation process for achieving motion control of an object to be controlled;
   a recognition and planning means for performing task and motion planning of the object to be controlled and recognition of outside world;
   an input/output interface for outputting a command to the object to be controlled and receiving as input, a state of the object to be controlled; and
   a route selecting means for controlling communications by switching connections among the motion control means, the recognition and planning means, and the input/output interface by means of a switch that has a plurality of external input/output ports and switches among digital signal paths respectively connected to the motion control means, the recognition and planning means, and the input/output interface, wherein
   motions of a robot of the object to be controlled are controlled on a basis of results of the task and motion planning of the object to be controlled and the recognition of the outside world while controlling the communications by switching the connections among the motion control means, the recognition and planning means, and the input/output interface by the route selecting means.

2. The robot controller as claimed in claim 1, wherein the route selecting means has a function to control an order of priority of data transfer, and the route selecting means controls communications by switching the connections among the motion control means, the recognition and planning means, and the input/output interface on a basis of the order of priority of data transfer.

3. The robot controller as claimed in claim 2, wherein the route selecting means controls the order of priority of data transfer according to a control situation of the object to be controlled, and the route selecting means controls communications by switching the connections among the motion control means, the recognition and planning means, and the input/output interface on a basis of the order of priority of data transfer according to the control situation of the object to be controlled.

4. The robot controller as claimed in claim 3, wherein the control situation of the object to be controlled is a control error.

5. The robot controller as claimed in claim 3, wherein the control situation of the object to be controlled is a control desired position.

6. The robot controller as claimed in claim 3, wherein the route selecting means has an exclusive signal line for making notification of a data transfer request.

7. The robot controller as claimed in claim 2, wherein the route selecting means controls the order of priority of data transfer according to a priority order data embedded in transfer data.

8. The robot controller as claimed in claim 2, wherein the route selecting means operates to temporarily stop transfer of non-preferential data when controlling the order of priority of data transfer.

9. The robot controller as claimed in claim 2, wherein the route selecting means operates to thin out non-preferential data when controlling the order of priority of the data transfer.

10. The robot controller as claimed in claim 1, wherein the route selecting means has a function to control an occupation ratio of a data transfer capacity, and the route selecting means controls communications by switching the connections among the motion control means, the recognition and planning means, and the input/output interface on a basis of the occupation ratio of the data transfer capacity.

11. The robot controller as claimed in claim 10, wherein the route selecting means controls the occupation ratio of the data transfer capacity according to the control situation of the object to be controlled, and the route selecting means controls communications by switching the connections among the motion control means, the recognition and planning means, and the input/output interface on a basis of the occupation ratio of the data transfer capacity according to the control situation of the object to be controlled.

12. The robot controller as claimed in claim 11, wherein the route selecting means operates so as to put a non-preferential data aside and stored in the storage means when controlling an order of priority of data transfer.

13. The robot controller as claimed in claim 10, wherein the route selecting means controls the occupation ratio of the data transfer capacity on a basis of occupation ratio data embedded in transfer data.

14. The robot controller as claimed in claim 1, wherein the route selecting means has a function to control a clock rate of data transfer, and the route selecting means controls communications by switching the connections among the motion control means, the recognition and planning means, and the input/output interface by changing the clock rate of the data transfer according to a control situation of the object to be controlled.

15. The robot controller as claimed in claim 1, wherein
the route selecting means has a storage means to provide time buffering between the motion control means and the recognition and planning means, and
the route selecting means controls communications by switching the connections among the motion control means, the recognition and planning means, and the input/output interface.

16. A robot controller comprising:
motion control means for performing a calculation process for achieving motion control of an object to be controlled;
recognition and planning means for performing task and motion planning of the object to be controlled and recognition of outside world;
an input/output interface for outputting a command to the object to be controlled and receiving as input, a state of the object to be controlled;
a first route selecting means connected to the recognition and planning means by means of a switch that has a plurality of external input/output ports and switches a digital signal path connected to the recognition and planning means to one of the ports; and
a second route selecting means connected to the motion control means, the first route selecting means, and the input/output interface by means of a switch that has a plurality of external input/output ports and switches among digital signal paths connected to the motion control means, the recognition and planning means, and the input/output interface, wherein
motions of a robot of the object to be controlled is controlled on a basis of results of the task and motion planning of the object to be controlled and the recognition of the outside world while controlling communications by switching connections between the second route selecting means and the recognition and planning means by the first route selecting means and while controlling communications by switching connections between the recognition and planning means, the first route selecting means, and the input/output interface by the second route selecting means.

* * * * *